(12) United States Patent
Takeuchi et al.

(10) Patent No.: US 9,404,037 B2
(45) Date of Patent: Aug. 2, 2016

(54) LIQUID CRYSTAL DISPLAY DEVICE AND USEFUL LIQUID CRYSTAL COMPOSITION

(75) Inventors: Kiyofumi Takeuchi, Kitaadachi-gun (JP); Masakazu Kaneoya, Kitaadachi-gun (JP)

(73) Assignee: DIC CORPORATION, Tokyo (JP)

( * ) Notice: Subject to any disclaimer, the term of this patent is extended or adjusted under 35 U.S.C. 154(b) by 354 days.

(21) Appl. No.: 13/825,767

(22) PCT Filed: Sep. 22, 2011

(86) PCT No.: PCT/JP2011/071643
§ 371 (c)(1),
(2), (4) Date: Jun. 11, 2013

(87) PCT Pub. No.: WO2012/043387
PCT Pub. Date: Apr. 5, 2012

(65) Prior Publication Data
US 2013/0300996 A1   Nov. 14, 2013

(30) Foreign Application Priority Data

Sep. 28, 2010 (JP) .................... 2010-216913

(51) Int. Cl.
*C09K 19/04* (2006.01)
*C09K 19/30* (2006.01)
(Continued)

(52) U.S. Cl.
CPC ............. *C09K 19/04* (2013.01); *C09K 19/3066* (2013.01); *C09K 19/322* (2013.01);
(Continued)

(58) Field of Classification Search
CPC .. C09K 19/3066; C09K 19/32; C09K 19/342; C09K 19/42; C09K 2019/301; C09K 2019/3004; C09K 2019/3009; C09K 2019/304; C09K 2019/3425; C09K 2019/3037; C09K 2019/0446; C09K 2019/121; C09K 2019/123; C09K 2019/3016; C09K 2019/3019; C09K 2019/3021; G02F 1/134363; G02F 1/133723; G02F 2001/13706
See application file for complete search history.

(56) References Cited

U.S. PATENT DOCUMENTS

2002/0017634 A1   2/2002 Heckmeier et al.
2008/0204612 A1   8/2008 Komitov
(Continued)

FOREIGN PATENT DOCUMENTS

JP   50-93665 A   7/1975
JP   57-618 A   1/1982
(Continued)

OTHER PUBLICATIONS

Hanaoka, K et al., "40.1: A New MVA-LCD by Polymer Sustained Alignment Technology", SID Sym. Digest, p. 1200-1203 (2004).
(Continued)

*Primary Examiner* — Shean C Wu
(74) *Attorney, Agent, or Firm* — Westerman, Hattori, Daniels & Adrian, LLP

(57) ABSTRACT

Provided is a liquid crystal display device of the VAIPS mode which uses a liquid crystal material having positive dielectric anisotropy and which has a fast response speed and excellent viewing angle characteristics without having a special cell structure such as pixel partitioning. Disclosed is a liquid crystal display device including: a plurality of independently controllable pixels; and a liquid crystal composition layer having positive dielectric anisotropy, wherein electrodes for controlling the pixels are provided on at least one of first and second substrates that interpose the liquid crystal phase, the long axis of the liquid crystal molecules of the liquid crystal composition layer is aligned substantially perpendicularly to the substrate surface or is in a hybrid alignment, the liquid crystal composition contains one kind or two or more kinds of compounds selected from a specific liquid crystal compound group, and the transmittance of the light that penetrates through the liquid crystal composition layer is modulated at the electric field generated by the electrode structure.

24 Claims, 3 Drawing Sheets

(51) Int. Cl.
*C09K 19/32* (2006.01)
*G02F 1/1343* (2006.01)
*G02F 1/1337* (2006.01)
*C09K 19/34* (2006.01)
*C09K 19/42* (2006.01)
*C09K 19/12* (2006.01)
*G02F 1/137* (2006.01)

(52) U.S. Cl.
CPC ............ *C09K19/3402* (2013.01); *C09K 19/42* (2013.01); *G02F 1/134363* (2013.01); *C09K 2019/0448* (2013.01); *C09K 2019/0466* (2013.01); *C09K 2019/121* (2013.01); *C09K 2019/123* (2013.01); *C09K 2019/301* (2013.01); *C09K 2019/304* (2013.01); *C09K 2019/3016* (2013.01); *C09K 2019/3019* (2013.01); *C09K 2019/3021* (2013.01); *C09K 2019/3037* (2013.01); *C09K 2019/3425* (2013.01); *G02F 2001/13706* (2013.01); *G02F 2001/133742* (2013.01); *G02F 2001/134372* (2013.01); *G02F 2001/134381* (2013.01); *G02F 2201/124* (2013.01)

(56) References Cited

U.S. PATENT DOCUMENTS

| | | | |
|---|---|---|---|
| 2009/0279044 A1 | 11/2009 | Hakoi et al. | |
| 2009/0316098 A1 | 12/2009 | Ishihara et al. | |
| 2010/0110351 A1* | 5/2010 | Kim et al. | 349/114 |
| 2013/0235290 A1* | 9/2013 | Takezoe et al. | 349/33 |

FOREIGN PATENT DOCUMENTS

| | | | |
|---|---|---|---|
| JP | 10-153782 A | 6/1998 | |
| JP | 10-186351 A | 7/1998 | |
| JP | 10-333171 A | 12/1998 | |
| JP | 11-24068 A | 1/1999 | |
| JP | 2001-33748 A | 2/2001 | |
| JP | 2002-12867 A | 1/2002 | |
| JP | 2002-182228 A | 6/2002 | |
| JP | 2003-287753 A | 10/2003 | |
| JP | 2007-226122 A | 9/2007 | |
| JP | 2008-20521 A | 1/2008 | |
| JP | 2010-90277 A | 4/2010 | |
| JP | 2010-134483 A | 6/2010 | |
| JP | 2010-519587 A | 6/2010 | |
| JP | 2010-175940 A | 8/2010 | |
| JP | 2010-198046 A | 9/2010 | |
| WO | 2009/154258 A1 | 12/2009 | |

OTHER PUBLICATIONS

International Search Report of PCT/JP2011/071642, date of mailing date Oct. 18, 2011.
International Search Report of PCT/JP2011/071643, date of mailing date Dec. 20, 2011.
Kim, D.H. et al., "Multi domain vertical alignment liquid crystal device controlled by in-plane field" Eurodisplay Proc., p. 142-145 (2009).
Kim, K.-H. et al., "41.3: New LCD Modes for Wide-Viewing-Angle Applications" SID Sym. Digest, p. 1085-1088 (1998).
Kim, K.H. et al., "A Novel Wide Viewing Angle Technology for AM-LCDs", Proc. 13th IDW, p. 175-176 (1997).
Kim, K.H. et al., "Domain Divided Vertical Alignment Mode with Optimized Fringe Field Effect", Proc. 18th IDRC, Asia Display, p. 383-386 (1998).
Koma, N. et al., "P-1: Development of a High-Quality TFT-LCD for Projection Displays", SID Sym. Digest, p. 461-464 (1997).
Lee, S.H. "High-Transmittance, Wide-Viewing-Angle Nematic Liquid Crystal Display Controlled by Fringe-Field Switching", Proc. 18th IDRC, Asia Display, p. 371-374 (1998).
Lee, S.H. "Wide-Viewing-Angle Homeotropic Nematic Liquid Crystal Display Controlled by In-Plane Field", Proc. 13th IDW, p. 97-100 (1997).
Lee. S.H. et al., "P-91: Wide-Viewing Angle Dual-Domainlike Vertical-Alignment LCD", SID Sym. Digest, p. 838-841 (1998).
Liu, W. et al., "21.3: Electro-Optical Performance of a Vertically Aligned LCD Mode Using Electrically Controlled Self-Compensation", SID Sym. Digest, p. 319-322 (1998).
Oh-E, M. et al., "S23-1 Principles and Characteristics of Electro-Optical Behaviour with In-Plane Switching Mode", Proc. Asia Display, p. 577-580 (1995).
Ohmuro, K. "33.3: Development of Super-High-Image-Quality Vertical-Alignment-Mode LCD", SID Sym. Digest, p. 845-848 (1997).
Takeda, A. et al., "41.4: A Super-High-Image-Quality Multi-Domain Vertical Alignment LCD by New Rubbing-Less Technology", SID Sym. Digest, p. 1077-1080 (1998).
Yamaguchi, Y. et al., "19.4: Late-News Papers: Wide-Viewing-Angle Display Mode for the Active-Matrix LCD Using Bend-Alignment Liquid-Crystal Cell", SID Sym. Digest, p. 277-280 (1993).
Yoshida, H. et al, "23.1: Fast-Switching LCD with Multi-domain Vertical Alignment Driven by an Oblique Electric Field", SID Sym. Digest, p. 334-337 (2000).
U.S. Office Action dated May 7, 2015, issued in U.S. Appl. No. 13/825,766 (14 pages).

* cited by examiner

LIQUID CRYSTAL DISPLAY DEVICE AND USEFUL LIQUID CRYSTAL COMPOSITION

BACKGROUND OF THE INVENTION

1. Field of the Invention

The present invention relates to a liquid crystal display device which uses a nematic crystal composition having positive dielectric anisotropy ($\Delta\varepsilon>0$).

2. Description of the Related Art

Currently, regarding the devices of the active matrix drive system, display modes such as an optically compensated bend (OCB) mode, a vertical alignment (VA) mode and an in-plane switching (IPS) mode have been applied, due to their display quality, to portable terminals, liquid crystal TV sets, projectors, computers, and the like. Since an active matrix display system has a non-linear circuit provided for each pixel, and it has been suggested to use a thin film transistor (TFT) using amorphous silicon or polysilicon, or an organic semiconductor material. Furthermore, as a method for the alignment of liquid crystal molecules to cope with an increase in display size or high definition display, it has been suggested to use a photo-alignment technology. It has been suggested to use a phase difference film in order to obtain wider viewing angle characteristics for the display, or to use a photopolymerizable monomer in order to obtain clear display (SID Sym. Digest, 277 (1993); SID Sym. Digest, 845 (1997); SID Sym. Digest, 1077 (1998); SID Sym. Digest, 461 (1997); Proc. 18$^{th}$ IDRC, 383 (1998); SID Sym. Digest, 1200 (2004); Proc. Asia Display, 577 (1995); and Proc. 18$^{th}$ IDRC, 371 (1998)).

However, in order for liquid crystal display television sets to completely replace the conventional television sets utilizing cathode ray tubes (CRT) and to also cope with the demand for 3D imaging or field sequential display, liquid crystal TVs are still not satisfactory in terms of the response speed and viewing angle characteristics. For example, the IPS mode is excellent in the viewing angle characteristics, but is not satisfactory in terms of the response speed; and the VA mode exhibits a relatively fast response speed, but is not satisfactory in terms of the viewing angle characteristics. Accordingly, in addition to the use of the overdrive mode, an amelioration for enhancing the apparent response speed of display elements by changing the frame frequency from 60 Hz to a high frequency such as 120 Hz or 240 Hz, has been in progress. However, there are limitations in overcoming the limit of the response speed that is intrinsic to a liquid crystal material, if amelioration is made only in terms of the electronic circuit of these liquid crystal display devices. Thus, there is a demand for a drastic improvement in the response speed as a result of amelioration in the entirety of a display device including a liquid crystal material.

Furthermore, in order to improve the viewing angle characteristics in regard to the VA mode, a multi-domain vertical alignment (MVA) mode has been suggested in which the viewing angle characteristics are improved by partitioning the pixels, and changing the direction of orientation of the liquid crystal molecules for each of the partitioned pixels. In this mode, it is possible to improve the viewing angle characteristics; however, since it is required to produce liquid crystal cells that have a complicated structure uniformly in order to achieve pixel partitioning, a decrease in production efficiency has been unavoidable.

As a method of drastically improving such a problem, new drive systems that are different from the conventional drive systems have been suggested. For example, there is known a method of aligning a liquid crystal material having positive dielectric anisotropy ($\Delta\varepsilon>0$) perpendicularly to the substrate surface without voltage application, and driving liquid crystal molecules in a transverse electric field generated by the electrodes disposed on the substrate surface (JP 57-000618 A; JP 50-093665 A; JP 10-153782 A; JP 10-186351 A; JP 10-333171A; JP 11-024068 A; JP 2008-020521A; Proc. 13$^{th}$ IDW, 97 (1997); Proc. 13$^{th}$ IDW, 175 (1997); SID Sym. Digest, 319 (1998); SID Sym. Digest, 838 (1998); SID Sym. Digest, 1085 (1998); SID Sym. Digest, 334 (2000); and Eurodisplay Proc., 142 (2009)). In this method, as an electric field in the transverse direction curves, liquid crystal molecules align in a different direction when a voltage is applied; therefore, multiple domains can be formed without performing pixel partitioning as in the case of the MVA mode described above. Accordingly, the method is excellent in view of production efficiency. Liquid crystal display devices of such a mode are called, according to JP 10-153782 A; JP 10-186351A; JP 10-333171A; JP 11-024068 A; JP 2008-020521A; Proc. 13$^{th}$ IDW, 97 (1997); Proc. 13$^{th}$ IDW, 175 (1997); SID Sym. Digest, 319 (1998); SID Sym. Digest, 838 (1998); SID Sym. Digest, 1085 (1998); SID Sym. Digest, 334 (2000); and Eurodisplay Proc., 142 (2009), by various names such as EOC and VA-IPS, but in the present invention, the display mode will be hereinafter abbreviated as "VAIPS".

However, in the VAIPS mode, since the physical behavior of liquid crystal molecules is different from the conventional method for driving a liquid crystal display device, it is required to select a liquid crystal material under a criterion different from the conventional criteria in connection with the liquid crystal material.

That is, in general, the threshold voltage (Vc) of Fréedericksz transition in a twisted nematic (TN) mode is represented by the following formula:

$$Vc = \frac{\pi d_{cell}}{d_{cell} + \langle r1 \rangle}\sqrt{\frac{K11}{\Delta\varepsilon}} ; \qquad \text{[Mathematical Formula 1]}$$

the same threshold voltage in a super-twisted nematic (STN) mode is represented by the following formula:

$$Vc = \frac{\pi d_{gap}}{d_{cell} + \langle r2 \rangle}\sqrt{\frac{K22}{\Delta\varepsilon}} ; \qquad \text{[Mathematical Formula 2]}$$

and
the same threshold voltage in the VA mode is represented by the following formula:

$$Vc = \frac{\pi d_{cell}}{d_{cell} - \langle r3 \rangle}\sqrt{\frac{K33}{|\Delta\varepsilon|}} \qquad \text{[Mathematical Formula 3]}$$

wherein Vc represents the Fréedericksz transition (V); $\pi$ represents the ratio of the circumference of a circle to its diameter; $d_{cell}$ represents the distance (μm) between a first substrate and a second substrate; $d_{gap}$ represents the distance (μm) between a pixel electrode and a common electrode; $d_{ITO}$ represents the width (μm) of the pixel electrode and/or common electrode; $\langle r1 \rangle$, $\langle r2 \rangle$ and $\langle r3 \rangle$ represent extrapolation lengths (μm); K11 represents the elastic constant (N) of splay; K22 represents the elastic constant (N) of twist; K33 represents the elastic constant (N) of bend; and $\Delta\varepsilon$ represents dielectric anisotropy.

However, in the VAIPS mode, since these general calculation formulas do not fit, and no criteria for selecting the liquid crystal material are available, there has been no progress in the improvement of performance, and consequently, application thereof into liquid crystal display devices has been delayed.

On the other hand, in regard to the VAIPS mode, disclosures have also been made on preferred compounds as the liquid crystal material to be used (JP 2002-012867 A). However, the liquid crystal composition described in the relevant reference document uses a cyano-based compound, and therefore, the liquid crystal composition is not suitable for active matrix applications.

Liquid crystal display devices also have a problem of aiming to achieve mega contrast (CR) by enhancing the black level with a bright luminance. It has been suggested to improve the numerical aperture so as to enable increasing the pixel display area of LCDs, to apply a luminance enhancing film such as a dual brightness enhancement film (DBEF) or a cholesteric liquid crystal (CLC) film, or to reduce the light leakage caused by protrusions and the like when the liquid crystal is subjected to vertical alignment. Furthermore, there is also a demand for a display which is not easily brought into disorder even under a pressing pressure in a touch panel system.

SUMMARY OF THE INVENTION

It is an object of the invention to provide a liquid crystal display device of the VAIPS mode which uses a liquid crystal material having positive dielectric anisotropy (hereinafter, referred to as p-VAIPS), and which has a fast response speed and excellent viewing angle characteristics without having a special cell structure such as pixel partitioning. According to the invention, a liquid crystal display device which provides a display with a higher response speed that has been a problem of the related art technologies, achieves widening of the viewing angle more effectively, exhibits a high luminance at the time of light transmission and a high black level at the time of light blockage, and thereby enables an improvement to obtain a high contrast ratio.

The inventors of the present invention conducted a thorough investigation in order to solve the problem described above, and as a result, they found that the problem can be solved by combining a VAIPS liquid crystal display device having a particular structure and a liquid crystal composition containing a particular liquid crystal compound, thus completing the titled invention of the invention.

According to an aspect of the invention, there is provided a liquid crystal display device including a first substrate, a second substrate, and a liquid crystal composition layer having positive dielectric anisotropy that is interposed between the first substrate and the second substrate, the liquid crystal display having plural pixels, with each of the pixels being independently controllable and having a pair of a pixel electrode and a common electrode, these two electrodes being provided on at least one substrate of the first and second substrates, the long axis of the liquid crystal molecules of the liquid crystal composition layer being in an alignment substantially perpendicular to the substrate surface or in a hybrid alignment, the liquid crystal composition containing one kind or two or more kinds of compounds selected from the group consisting of compounds represented by General Formula (LC1) to General Formula (LC5):

[Chemical Formula 1]

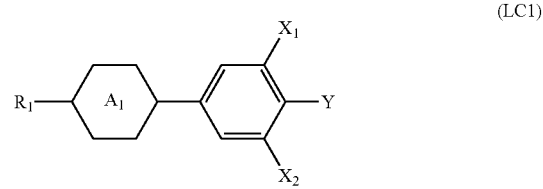

wherein $R_1$ represents an alkyl group having 1 to 15 carbon atoms; one or two or more $CH_2$ groups in the alkyl group may be substituted by —O—, —CH=CH—, —CO—, —COO—, —COO—, —C≡C—, —CF$_2$O— or —OCF$_2$— such that O atoms are not directly adjacent to each other; one or two or more H atoms in the alkyl group may be optionally substituted by halogen; $A_1$, $A_2$ and $A_3$ each independently represent any one of the following structures:

[Chemical Formula 2]

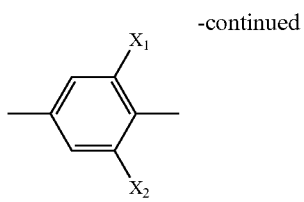

(wherein $X_1$ and $X_2$ each independently represent H, Cl, F, $CF_3$ or $OCF_3$); one or two or more $CH_2$ groups in $A_1$ and $A_2$ may be substituted by —CH=CH—, —$CF_2O$— or —$OCF_2$—; one or two or more CH groups in $A_1$ and $A_2$ may be substituted by N atoms; one or two or more H atoms in $A_1$ and $A_2$ may be substituted by Cl, F, $CF_3$ or $OCF_3$; $X_1$ to $X_5$ each independently represent H, Cl, F, $CF_3$ or $OCF_3$; Y represents Cl, F, $CF_3$ or $OCF_3$; $Z_1$ to $Z_4$ each independently represent a single bond, —CH=CH—, —C≡C—, —$CH_2CH_2$—, —$(CH_2)_4$—, —$OCH_2$—, —$CH_2O$—, —$OCF_2$— or —$CF_2O$—; at least one of $Z_1$ and $Z_2$ that exist is not a single bond; $Z_5$ represents a $CH_2$ group or an O atom; $m_1$ and $m_2$ each independently represent an integer from 0 to 3; $m_1+m_2$ represents 1, 2 or 3; and $m_3$ each independently represent an integer from 0 to 2, and the transmittance of the light that penetrates through the liquid crystal composition layer is modulated at the electric field generated by the electrode structure.

In the invention, the long axis of the liquid crystal molecules in the substrate is aligned substantially perpendicularly to the substrate surface, or is in a hybrid alignment. Here, the hybrid alignment means a state in which the long axis of the liquid crystal molecules interposed between two sheets of substrates is aligned substantially in parallel to the substrate surface on one of the substrate side, and the long axis is aligned substantially perpendicularly on the other substrate side. In the present specification, the state in which the long axis of the liquid crystal molecules is aligned substantially perpendicularly is referred to as p-VAIPS, and the state in which the long axis is in a hybrid alignment is referred to as p-HBIPS. Furthermore, regarding the electrode structures of the p-VAIPS and p-HBIPS modes, the electrode structure of the conventional transverse electric field modes such as IPS, fringe-field switching (FFS) and improved FFS can be applied.

The behavior of liquid crystal molecules in the present invention is schematically described in FIG. 1 to FIG. 3, and the liquid crystal molecules undergo transition from the state without voltage application as illustrated in FIG. 1 to the state under voltage application as illustrated in FIG. 2 or FIG. 3. At this time, an increase in the response speed can be promoted by adopting a bend alignment state, which is advantageous in the flow effect. In general, the response speed is 20 msec to 40 msec in the IPS mode, and 10 msec to 30 msec in the TN mode; however, the response speed in the invention is 1 msec to 8 msec, which implies that a drastic improvement has been achieved.

In a conventional drive method of the TN mode, generally, a special optical film or the like must be used for the widening of the viewing angle, and thus the widening of the viewing angle is achieved only in a horizontal direction or in a vertical direction. On the other hand, in a drive method of the VA mode, although the viewing angle is generally wide, it is necessary to define the direction of tilt of the liquid crystal molecules by using zone rubbing, protrusions, a slit electrode, and the like, and to promote formation of multiple domains, and thus, the cell configuration tends to become complicated.

In the p-VAIPS and p-HBIPS modes of the invention, since the direction of tilt of the liquid crystal molecules can be defined by utilizing the line of electric force generated by the applied voltage, the formation of multiple domains can be achieved only by means of the shape of the pixel electrode, a relatively simple cell configuration is sufficient for operation, and an increase in the viewing angle and an increase in contrast can be achieved.

Further, in general, the value of the Fréedericksz transition (Vc) is represented by Formula (1) in the TN mode, by Formula (2) in the STN mode, and by Formula (3) in the VA mode. However, it was found that the following Mathematical Formula (4) is applicable to the liquid crystal display device of the invention:

$$Vc \propto \frac{d_{gap-\langle r'\rangle}}{d_{ITO}+\langle r\rangle} \frac{\pi d_{cell}}{d_{cell}-\langle r3\rangle} \sqrt{\frac{K33}{|\Delta\varepsilon|}} \qquad \text{[Mathematical Formula 4]}$$

wherein Vc represents the Fréedericksz transition (V); π represents the ratio of the circumference of a circle to its diameter; $d_{cell}$ represents the distance (μm) between a first substrate and a second substrate; $d_{gap}$ represents the distance (μm) between a pixel electrode and a common electrode; $d_{ITO}$ represents the width (μm) of the pixel electrode and/or common electrode; <r>, <r'> and <r3> represent extrapolation lengths (μm); K33 represents the elastic constant (N) of bend; and Δ∈ represents dielectric anisotropy. Regarding the cell configuration according to Mathematical Formula 4, it was found that a decrease in the driving voltage can be attempted by making the value of $d_{gap}$ as low as possible, and the value of $d_{ITO}$ as high as possible, and regarding the liquid crystal composition used, a decrease in the driving voltage can be attempted by selecting a high absolute value of Δ∈ and a low value of K33. Based on these findings, the inventors found a liquid crystal having negative positive dielectric anisotropy that is appropriate for the liquid crystal display device described above.

Further, the most prominent feature of the liquid crystal display device of the invention is that these liquid crystal molecules that can easily start moving start to move about not at the center between two sheets of substrates, but from a site that is shifted toward any one substrate surface and has been brought closer to one substrate, and this feature is different from that of the conventional TN, IPS, VA and OCB modes.

The invention has improved characteristics such as the response speed, amount of light transmission, light leakage caused by an external pressure such as the use of a touch panel, viewing angle and contrast ratio, and has realized a higher response speed, a larger amount of light transmission, a reduction in light leakage caused by an external pressure, a wider viewing angle, and a higher contrast ratio, as compared with liquid crystal display devices produced by the conventional technologies.

DESCRIPTION OF REFERENCE NUMERALS

Figure 1:
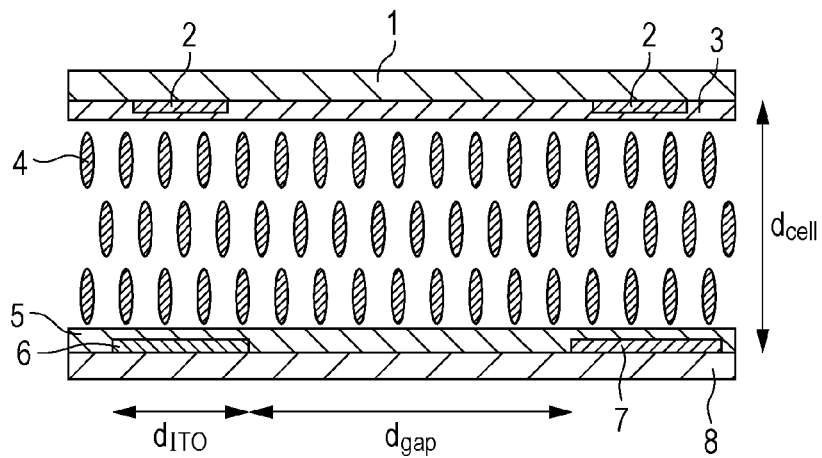
FIG. 1 is a diagram illustrating the state of alignment of liquid crystal molecules without voltage application (an example of p-VAIPS)
Figure 2:
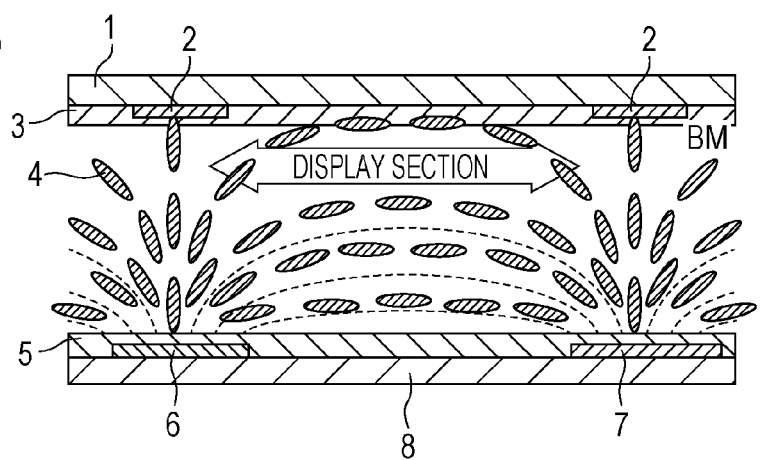
FIG. 2 is a diagram illustrating the state of realignment of liquid crystal molecules at the time of voltage application (an example of p-VAIPS)
Figure 3:
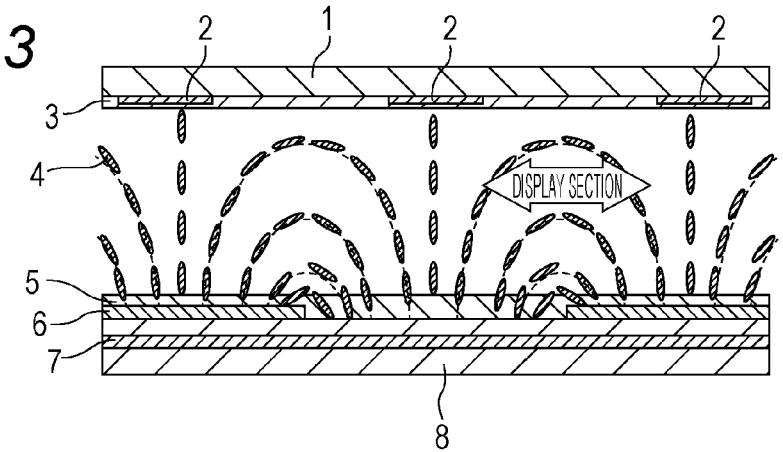
FIG. 3 is a diagram illustrating the state of realignment of liquid crystal molecules at the time of voltage application in the case where a common electrode is disposed below a pixel electrode, with an insulating layer interposed therebetween (FFS) (an example of p-VAIPS)

1 FIRST SUBSTRATE
2 LIGHT BLOCKING LAYER
3 ALIGNMENT LAYER
4 LIQUID CRYSTAL
5 ALIGNMENT LAYER
6 PIXEL ELECTRODE
7 COMMON ELECTRODE
8 SECOND SUBSTRATE

DETAILED DESCRIPTION OF THE PREFERRED EMBODIMENTS

The liquid crystal composition according to the invention contains a liquid crystal compound represented by any one of the General Formula (LC1) to General Formula (LC5). However, in these general formulas, $R_1$ is preferably an alkyl group having 1 to 8 carbon atoms, an alkenyl group having 2 to 8 carbon atoms, or an alkoxy group having 1 to 8 carbon atoms;

$A_1$ and $A_2$ are each independently preferably a 1,4-cyclohexylene group, a 1,4-phenylene group, a 3-fluoro-1,4-phenylene group, or a 3,5-difluoro-1,4-phenylene group;

$X_1$ to $X_5$ are each independently preferably H or F; Y is preferably F, $CF_3$ or $OCF_3$;

$Z_1$ to $Z_4$ are each independently preferably a single bond, —C≡C—, —$CH_2CH_2$—, —$OCH_2$—, —$CH_2O$—, —$OCF_2$— or —$CF_2O$—; any one of $Z_1$ to $Z_4$ that exist is —C≡C—, —$CH_2CH_2$—, —$OCH_2$—, —$CH_2O$—, —$OCF_2$— or —$CF_2O$—; among $Z_1$ to $Z_4$, when there are substituents that exist elsewhere, these substituents are preferably single bonds;

$m_1$ and $m_2$ each independently represent an integer from 0 to 2; and $m_1+m_2$ is preferably 1 or 2.

More preferably, the liquid crystal compound represented by any one of General Formula (LC1) to General Formula (LC5) are such that the compound of General Formula (LC1) is preferably a compound represented by any one of General Formula (LC1)-1 to General Formula (LC1)-4:

[Chemical Formula 3]

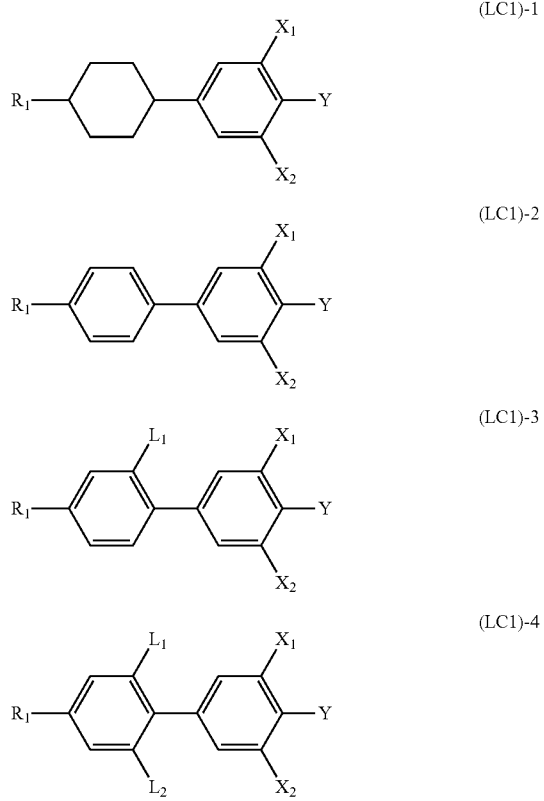

wherein $R_1$ represents an alkyl group having 1 to 15 carbon atoms; one or two or more $CH_2$ groups in the alkyl group may be substituted by —O—, —CH=CH—, —CO—, —COO—, —COO—, —C≡C—, —$CF_2O$— or —$OCF_2$— such that O atoms are not directly adjacent to each other; Y represents Cl, F, $CF_3$ or $OCF_3$; and $X_1$, $X_2$, $L_1$ and $L_2$ each represent H, Cl, F, $CF_3$ or $OCF_3$; and/or the compound of General Formula (LC2) is preferably a compound represented by any one of the following General Formula (LC2)-1 to General Formula (LC2)-10:

[Chemical Formula 4]

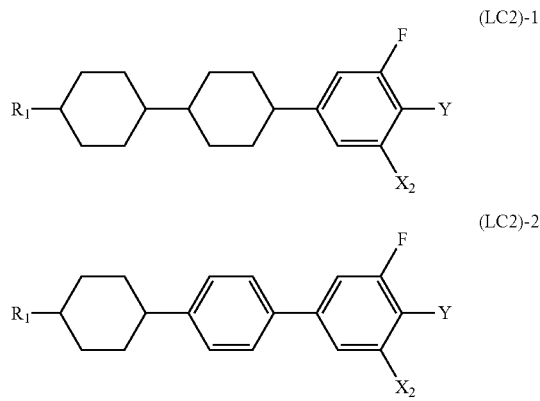

-continued
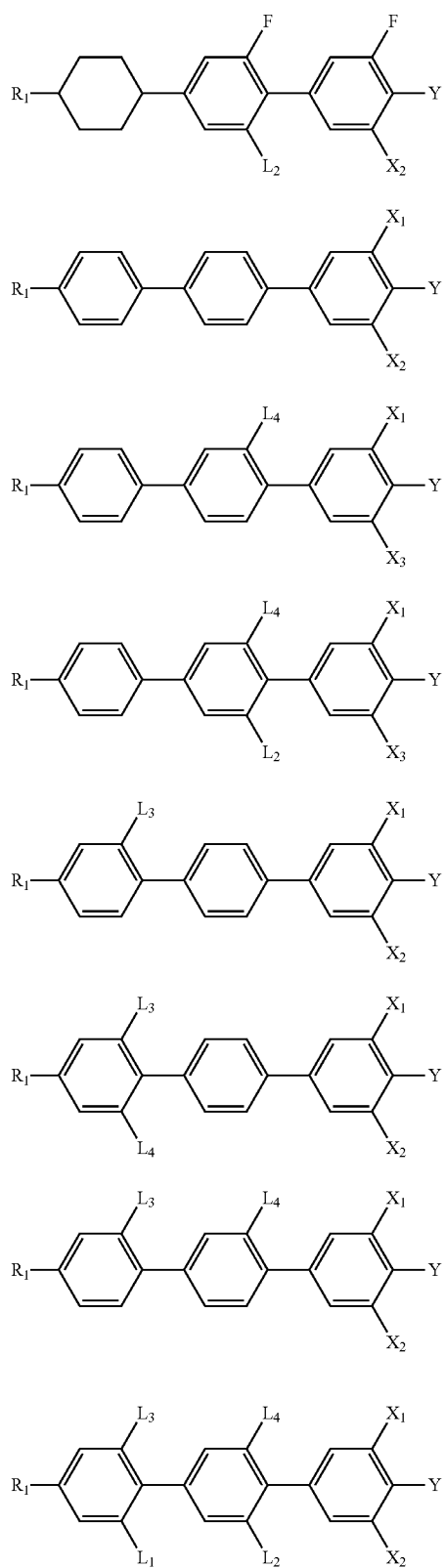
wherein $R_1$, Y and $X_2$ have the same meanings as $R_1$, Y and $X_2$ in General Formula (LC2), respectively; $L_1$, $L_2$, $L_3$ and $L_4$ each represent H, Cl, F, $CF_3$ or $OCF_3$; and/or
the compound of General Formula (LC3) is preferably a compound represented by any one of the following General Formula (LC3)-1 to General Formula (LC3)-34:
[Chemical Formula 5]
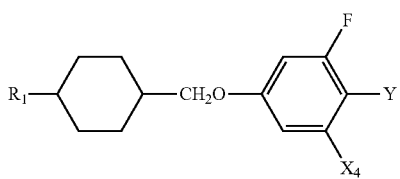
(LC3)-1
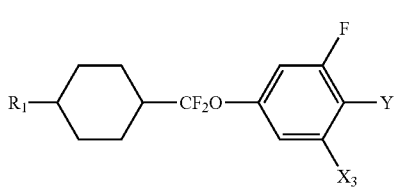
(LC3)-2
(LC3)-3
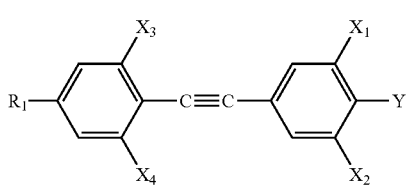
(LC3)-4
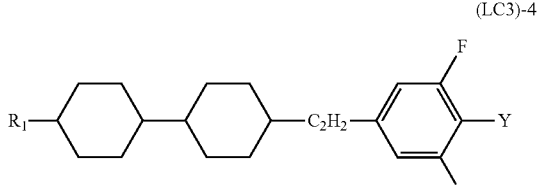
(LC3)-5
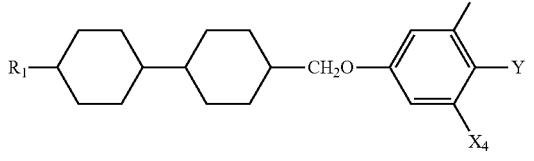
(LC3)-6
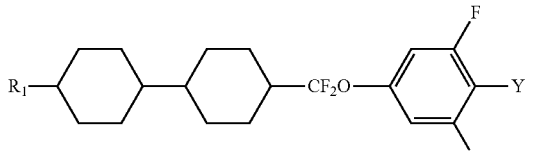
(LC3)-7
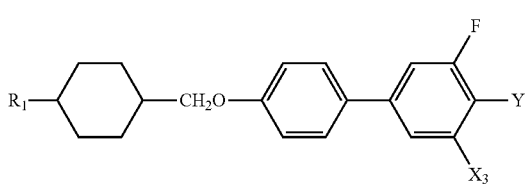

-continued
(LC3)-8
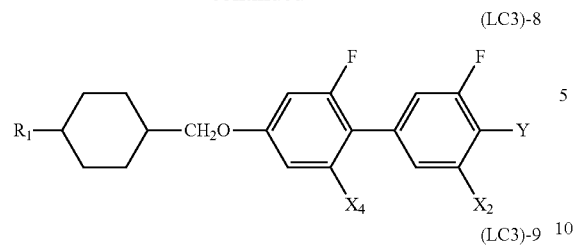
(LC3)-9
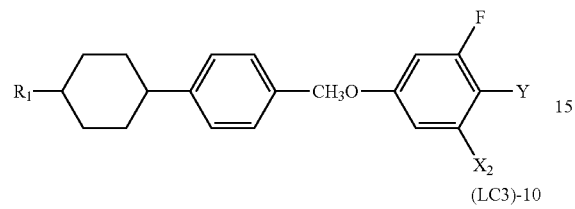
(LC3)-10
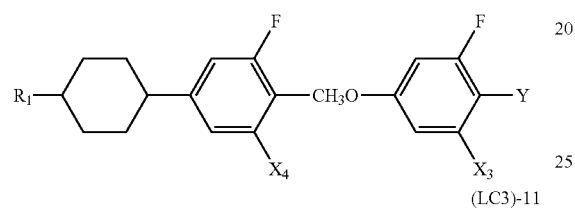
(LC3)-11
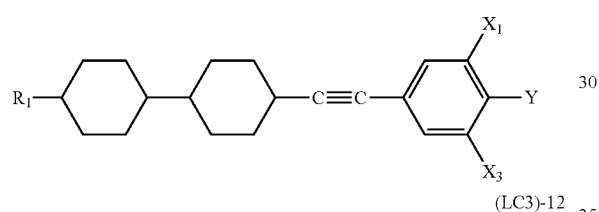
(LC3)-12
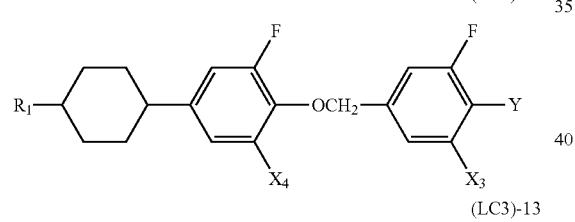
(LC3)-13
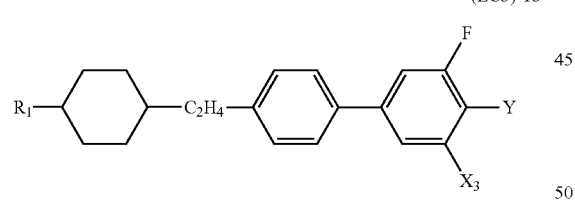
(LC3)-14
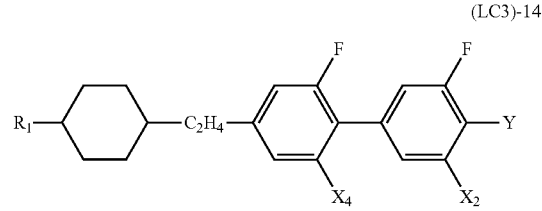
(LC3)-15
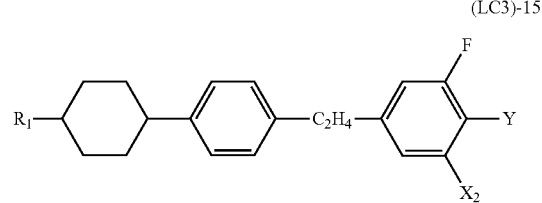
(LC3)-16
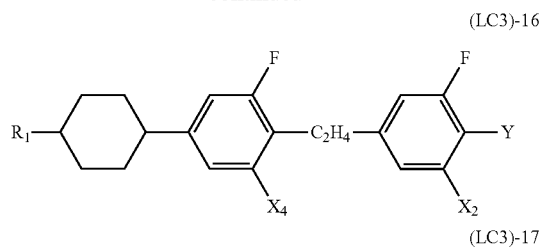
(LC3)-17
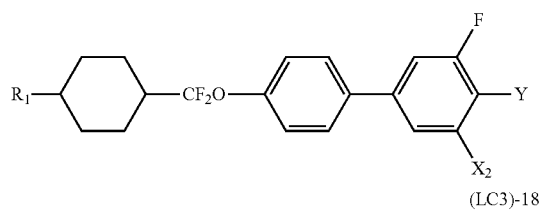
(LC3)-18
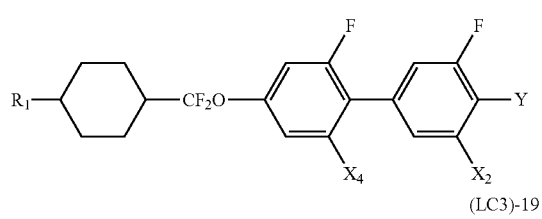
(LC3)-19
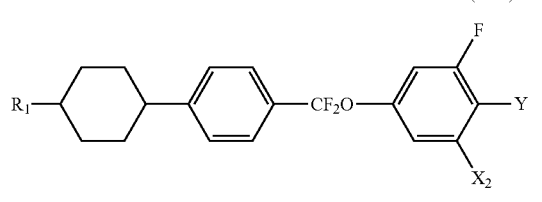
(LC3)-20
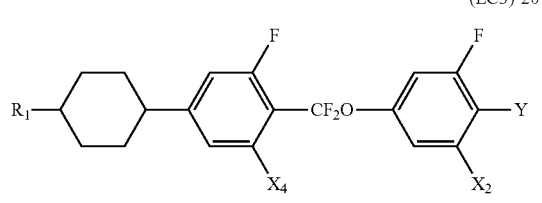
(LC3)-21
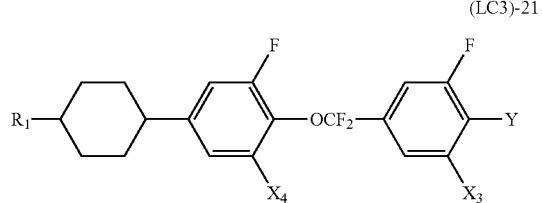
(LC3)-22
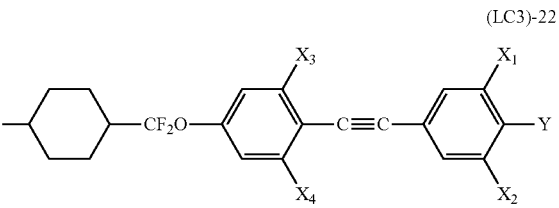
(LC3)-23
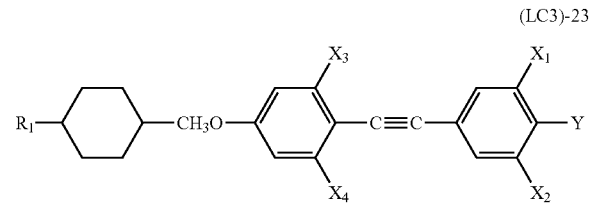

(LC3)-24
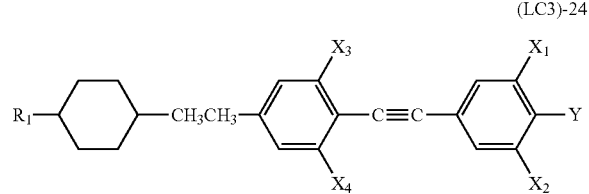

(LC3)-25
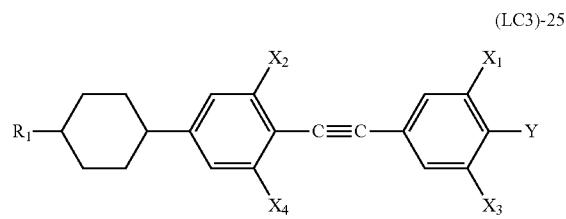

(LC3)-26
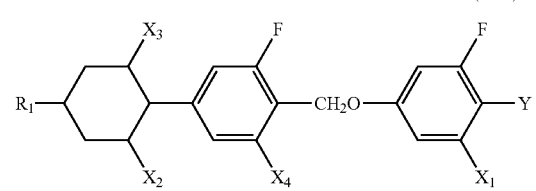

[Chemical Formula 6]

(LC3)-27
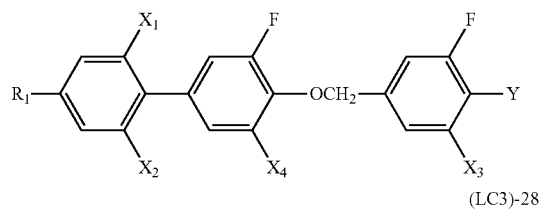

(LC3)-28
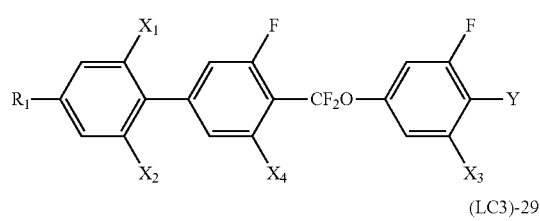

(LC3)-29
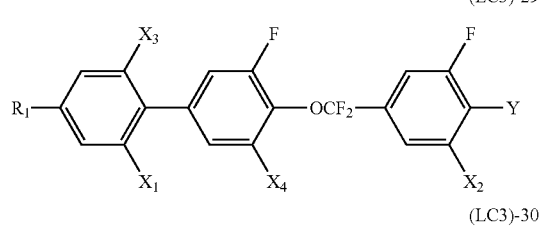

(LC3)-30
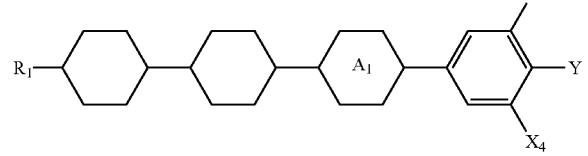

(LC3)-31
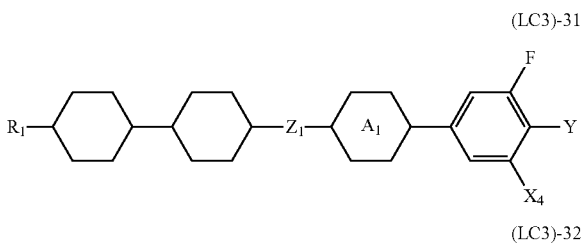

(LC3)-32
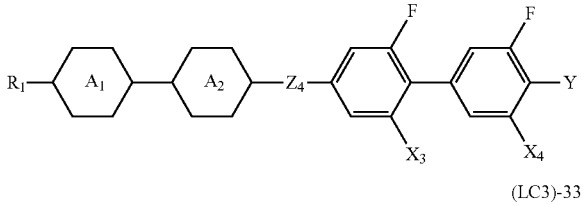

(LC3)-33
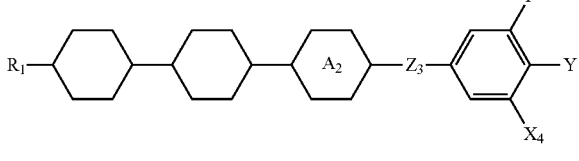

(LC3)-34
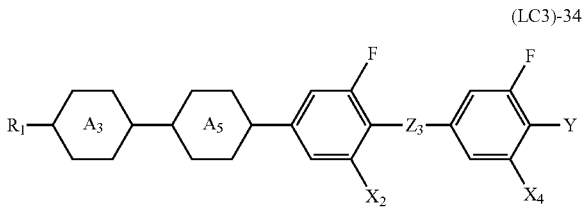

wherein $R_1$ represents an alkyl group having 1 to 15 carbon atoms; one or two or more $CH_2$ groups in the alkyl group may be substituted by —O—, —CH=CH—, —CO—, —COO—, —COO—, —C≡C—, —$CF_2$O— or —$OCF_2$— such that O atoms are not directly adjacent to each other; one or two or more H atoms in the alkyl group may be optionally substituted by halogen; $X_2$ and $X_4$ each independently represent H, Cl, F, $CF_3$ or $OCF_3$; $Z_1$ represents a single bond, —CH=CH—, —C≡C—, —$CH_2CH_2$—, —$(CH_2)_4$—, —$OCH_2$—, —$CH_2O$—, —$OCF_2$— or —$CF_2O$—; and $m_1$ represents an integer from 0 to 3; and/or the compound of General Formula (LC4) is preferably a compound represented by any one of the following General Formula (LC4)-1 to General Formula (LC4)-8; and the compound of General Formula (LC5) is preferably a compound represented by any one of the following General Formula (LC5)-1 to General Formula (LC5)-6:

[Chemical Formula 7]

(LC4)-1
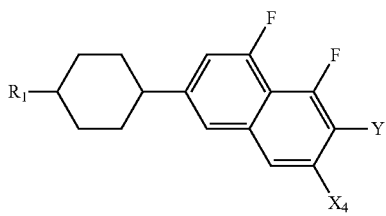

(LC4)-2
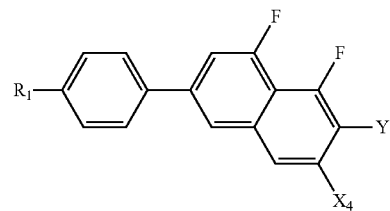

(LC4)-3
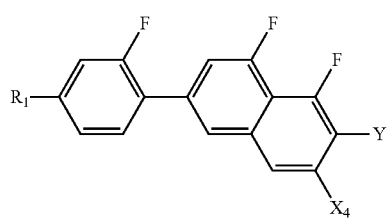

(LC4)-4
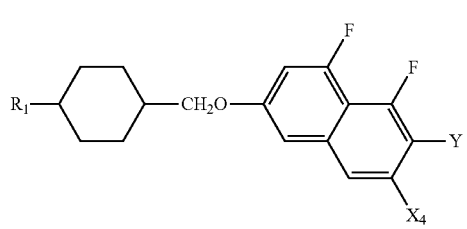

(LC4)-5
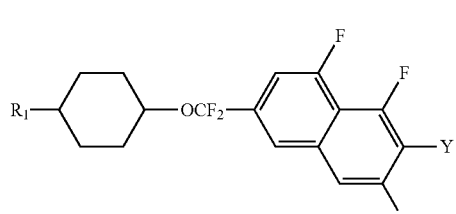

(LC4)-6
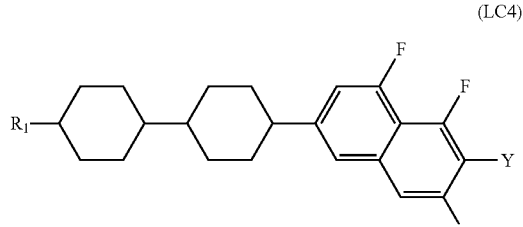

(LC4)-7
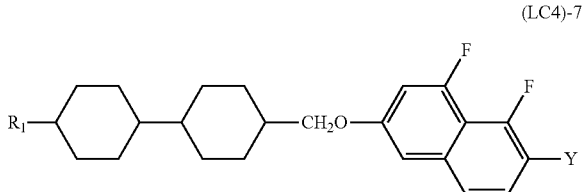

(LC4)-8
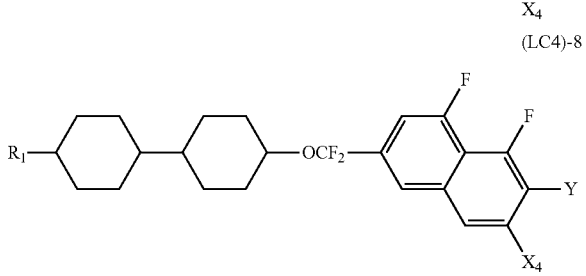

(LC5)-1
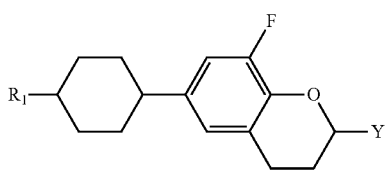

(LC5)-2
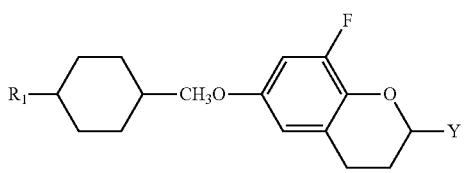

(LC5)-3
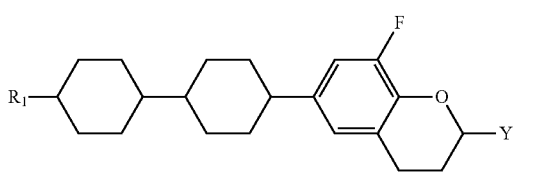

(LC5)-4
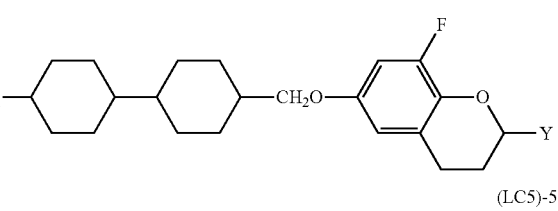

(LC5)-5
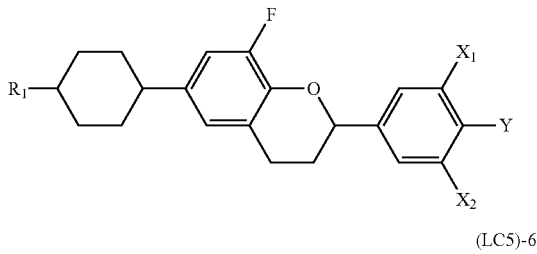

(LC5)-6
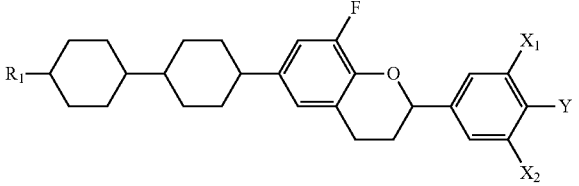

wherein $R_1$, $X_1$, $X_2$, $X_4$, $X_5$ and Y have the same meanings as $R_1$, $X_1$, $X_2$, $X_4$, $X_5$ and Y in General Formula (LC4) or General Formula (LC5).

A compound in which in regard to General Formula (LC1) and General Formula (LC2), $R_1$ is preferably an alkenyl and/or $R_2$ is preferably an alkoxy group or an alkenyloxy group; in regard to General Formulas (LC3) to (LC5), at least one of $R_1$ and $R_2$ is preferably an alkenyl; in regard to General Formula (LC3), at least one of $Z_1$ and $Z_2$ is —OCH$_2$— or —CH$_2$O—, is preferred.

Furthermore, it is preferable that the liquid crystal composition layer contain a compound represented by General Formula (LC6):

[Chemical Formula 8]

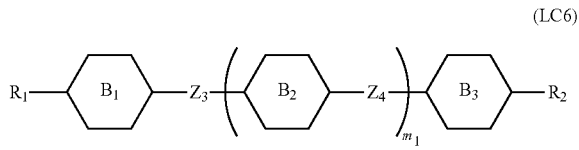
(LC6)

wherein $R_1$, $R_2$, $Z_3$, $Z_4$ and $m_1$ have the same meanings as $R_1$, $R_2$, $Z_3$, $Z_4$ and $m_1$ in General Formula (LC1) to General Formula (LC5), respectively; $B_1$ to $B_3$ each independently represent the following:

[Chemical Formula 9]

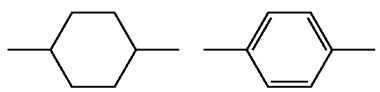

(wherein one or two or more $CH_2CH_2$ groups in the cyclohexane ring may be substituted by —CH=CH—, —$CF_2$O— or —$OCF_2$—; and one or two or more CH groups in the benzene ring may be substituted by N atoms).

The compound represented by General Formula (LC6) is a compound represented by any one of the following General Formula (LC6)-1 to General Formula (LC6)-15:

[Chemical Formula 10]

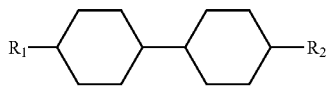
(LC6)-1

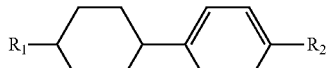
(LC6)-2

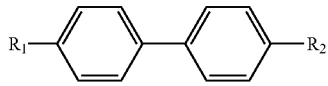
(LC6)-3

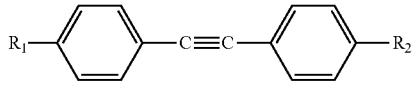
(LC6)-4

(LC6)-5

(LC6)-6

(LC6)-7

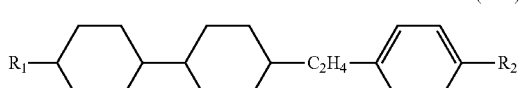
(LC6)-8

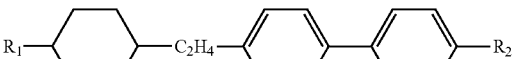
(LC6)-9

(LC6)-10

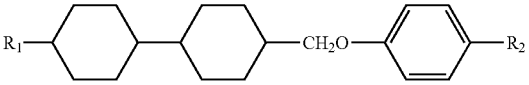
(LC6)-11

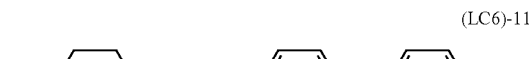
(LC6)-12

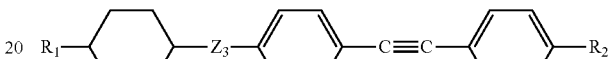
(LC6)-13

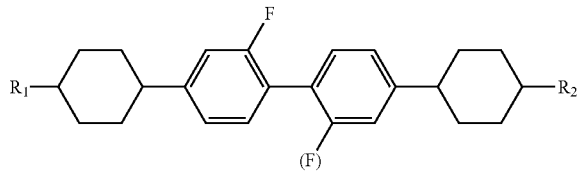
(LC6)-14

(LC6)-15

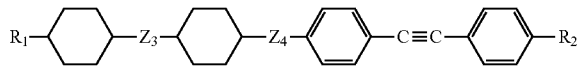

wherein $R_1$, $R_2$, $Z_3$ and $Z_4$ have the same meanings as $R_1$, $R_2$, $Z_3$ and $Z_4$ in General Formula (LC6), respectively.

In regard to General Formula (LC6), $R_1$ and/or $R_2$ is preferably an alkenyl or alkenyloxy group; any one of $Z_1$ and $Z_2$ is —CH=CH—, —C≡C—, —$CH_2CH_2$—, —$(CH_2)_4$—, —$OCH_2$—, —$CH_2O$—, —$OCF_2$— or —$CF_2O$—; and the other is preferably a single bond or —C≡C—.

The liquid crystal composition that is used in the invention preferably contains the compounds represented by General Formula (LC1) to (LC5) in an amount of 100% to 20% by mass, more preferably 100% to 40% by mass, and particularly preferably 100% to 60% by mass.

Furthermore, it is preferable that the liquid crystal composition contain two or more kinds of compounds for which Δ∈ in General Formula (LC1) to (LC5) is 4 or more.

Furthermore, the liquid crystal composition may contain one kind or two or more kinds of polymerizable compounds, and preferably, the polymerizable compound is a disc-shaped liquid crystal compound having a structure in which a benzene derivative, a triphenylene derivative, a truxene derivative, a phthalocyanine derivative or a cyclohexane derivative serves as a parent nucleus at the center of the molecule, and a linear alkyl group, a linear alkoxy group or a substituted benzoyloxy group is radially substituted as a side chain.

Specifically, the polymerizable compound is preferably a polymerizable compound represented by General Formula (PC1):

[Chemical Formula 11]

(PC1)

wherein $P_1$ represents a polymerizable functional group; $Sp_1$ represents a spacer group having 0 to 20 carbon atoms; $Q_1$ represents a single bond, —O—, —NH—, —NHCOO—, —OCONH—, —CH=CH—, —CO—, —COO—, —OCO—, —OCOO—, —OOCO—, —CH=CH—, —CH=CH—COO—, —OCO—CH=CH— or —C≡C—; $n_1$ and $n_2$ each independently represent 1, 2 or 3; MG represents a mesogen group or a mesogenic supporting group; $R_3$ represents a halogen atom, a cyano group or an alkyl group having 1 to 25 carbon atoms; one or two or more $CH_2$ groups in the alkyl group may be substituted by —O—, —S—, —NH—, —N(CH$_3$)—, —CO—, —COO—, —OCO—, —OCOO—, —SCO—, —COS— or —C≡C— such that O atoms are not directly adjacent to each other; or $R_3$ represents $P_2$-$Sp_2$-$Q_2$- (wherein $P_2$, $Sp_2$ and $Q_2$ each independently have the same meanings as $P_1$, $Sp_1$ and $Q_1$)).

More preferably, the polymerizable compound is a polymerizable compound in which MG in General Formula (PC1) is represented by the following structure:

—C$_1$—Y$_1$—(C$_2$—Y$_2$)$_{n_5}$C$_3$—     [Chemical Formula 12]

wherein $C_1$ to $C_3$ each independently represent a 1,4-phenylene group, a 1,4-cyclohexylene group, a 1,4-cyclohexenyl group, a tetrahydropyrane-2,5-diyl group, a 1,3-dioxane-2,5-diyl group, a tetrahydrothiopyrane-2,5-diyl group, a 1,4-bicyclo(2,2,2)octylene group, a decahydronaphthalene-2,6-diyl group, a pyridine-2,5-diyl group, a pyrimidine-2,5-diyl group, a pyrazine-2,5-diyl group, a 1,2,3,4-tetrahydronaphthalene-2,6-diyl group, a 2,6-naphthylene group, a phenanthrene-2,7-diyl group, a 9,10-dihydrophenanthrene-2,7-diyl group, a 1,2,3,4,4a,9,10a-octahydrophenanthrene-2,7-diyl group, or a fluorene-2,7-diyl group; the 1,4-phenylene group, 1,2,3,4-tetrahydronaphthalene-2,6-diyl group, 2,6-naphthylene group, phenanthrene-2,7-diyl group, 9,10-dihydrophenanthrene-2,7-diyl group, 1,2,3,4,4a,9,10a-octahydrophenanthrene-2,7-diyl group, and fluorene-2,7-diyl group may have, as substituents, one or more of F, Cl, CF$_3$, OCF$_3$, a cyano group, an alkyl group having 1 to 8 carbon atoms, an alkoxy group, an alkanoyl group, an alkanoyloxy group, an alkenyl group having 2 to 8 carbon atoms, an alkenyloxy group, an alkenoyl group, or an alkenoyloxy group; $Y_1$ and $Y_2$ each independently represent —COO—, —OCO—, —CH$_2$CH$_2$—, —OCH$_2$—, —CH$_2$O—, —CH=CH—, —C≡C—, —CH=CHCOO—, —OCOCH=CH—, —CH$_2$CH$_2$COO—, —CH$_2$CH$_2$OCO—, —COOCH$_2$CH$_2$—, —OCOCH$_2$CH$_2$—, —CONH—, —NHCO— or a single bond; and $n_5$ represents 0, 1 or 2. $Sp_1$ and $Sp_2$ each independently represent an alkylene group, and the alkylene group may be substituted with one or more halogen atoms or CN. One or two or more $CH_2$ groups that are present in this group may be substituted by —O—, —S—, —NH—, —N(CH$_3$)—, —CO—, —COO—, —OCO—, —OCOO—, —SCO—, —COS— or —C≡C— such that O atoms are not directly adjacent to each other, and $P_1$ and $P_2$ are each independently represented by any one of the following General Formula (PC1-a) to General Formula (PC1-d):

[Chemical Formula 13]

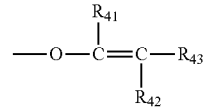
(PC1-a)

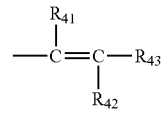
(PC1-b)

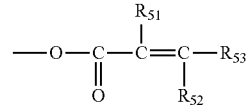
(PC1-c)

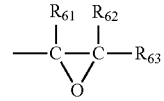
(PC1-d)

wherein $R_{41}$ to $R_{43}$, $R_{51}$ to $R_{53}$, and $R_{61}$ to $R_{63}$ each independently represent a hydrogen atom, a halogen atom, or an alkyl group having 1 to 5 carbon atoms.

More specifically, the polymerizable compound is preferably a polymerizable compound in which General Formula (PC1) is represented by General Formula (PC1)-1 or General Formula (PC1)-2:

[Chemical Formula 14]

(PC1)-1

(PC1)-2 wherein $P_1$, $Sp_1$, $Q_1$, $P_2$, $Sp_2$, $Q_2$ and MG have the same meanings as $P_1$, $Sp_1$, $Q_1$, $P_2$, $Sp_2$, $Q_2$ and MG of General Formula (PC1); and $n_3$ and $n_4$ each independently represent 1, 2 or 3.

More specifically, the polymerizable compound is more preferably a polymerizable compound in which General Formula (PC1) is represented by any one of General Formula (PC1)-3 to General Formula (PC1)-8:

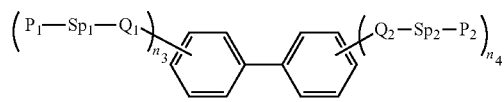
(PC1)-3

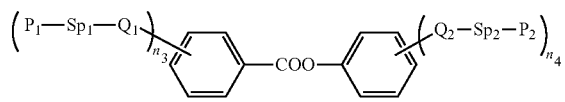
(PC1)-4

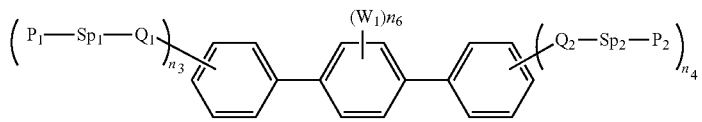
(PC1)-5

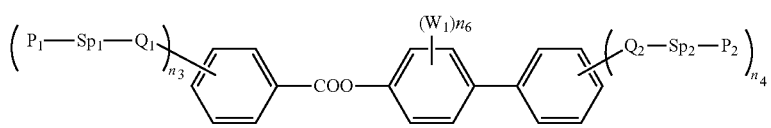
(PC1)-6

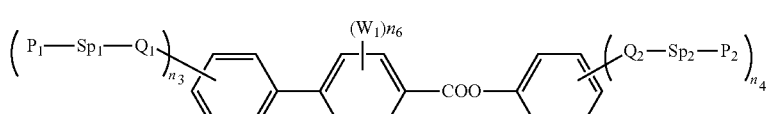
(PC1)-7

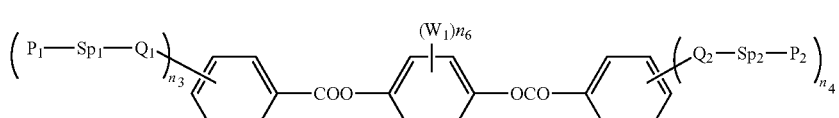
(PC1)-8 wherein $W_1$ each independently represents F, $CF_3$, $OCF_3$, $CH_3$, $OCH_3$, an alkyl group having 2 to 5 carbon atoms, an alkoxy group, an alkenyl group, $COOW_2$, $OCOW_2$ or $OCOOW_2$ (wherein $W_2$ represents a linear or branched alkyl group having 1 to 10 carbon atoms, or an alkenyl group having 2 to 5 carbon atoms); and $n_6$ represents 0, 1, 2, 3 or 4.

Even more preferably, $Sp_1$, $Sp_2$, $Q_1$ and $Q_2$ in the General Formula (PC1) for the polymerizable compound are all single bonds; $n_3$ and $n_4$ are such that $n_3+n_4$ is from 3 to 6; $P_1$ and $P_2$ are represented by formula (7-b); $W_1$ is F, $CF_3$, $OCF_3$, $CH_3$ or $OCH_3$; and $n_6$ represents 1 or more.

Furthermore, the polymerizable compound is also preferably a disc-shaped liquid crystal compound in which MG in General Formula (PC1) is represented by General Formula (PC1)-9:

[Chemical Formula 16]

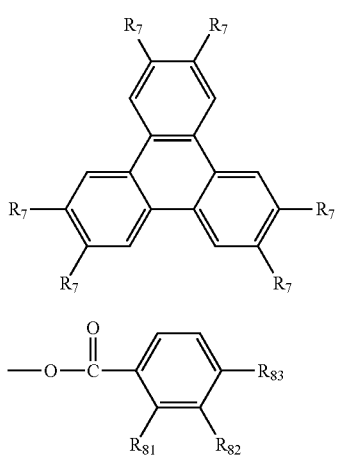

(PC1)-9

(PC1)-e wherein $R_2$ each independently represents $P_1$-$Sp_1$-$Q_1$ or a substituent of General Formula (PC1-e) (wherein $P_1$, $Sp_1$ and $Q_1$ have the same meanings as $P_1$, $Sp_1$ and $Q_1$ of General Formula (PC1), respectively); $R_{81}$ and $R_{82}$ each independently represent a hydrogen atom, a halogen atom or a methyl group; $R_{83}$ represents an alkoxy group having 1 to 20 carbon atoms; and at least one hydrogen atom in the alkoxy group is substituted by a substituent represented by any one of the General Formulas (PC1-a) to (PC1-d).

The amount of use of the polymerizable compound is preferably 0.1% to 2.0% by mass.

The liquid crystal composition can be used alone for the applications described above, may further include one kind or two or more kinds of oxidation inhibitors, or may further include one kind or two or more kinds of UV absorbers.

The product ($\Delta n \cdot d$) of the refractive index anisotropy ($\Delta n$) of the liquid crystal composition with the distance (d) between the first substrate and the second substrate of a display device is, in the case of a vertical alignment, preferably 0.20 to 0.59; in the case of a hybrid alignment, preferably 0.21 to 0.61; in the case of a vertical alignment, particularly preferably 0.33 to 0.40; and in the case of a hybrid alignment, particularly preferably 0.34 to 0.44.

On each of the surfaces that are brought into contact with the liquid crystal composition on the first substrate and the second substrate of the display device, an alignment film formed from a polyimide (PI), a chalcone, a cinnamate or the like can be provided so as to align the liquid crystal composition, and the alignment film may also be a film produced using a photo-alignment technology.

In the case of vertical alignment, the tilt angle between the substrate and the liquid crystal composition is preferably 85° to 90°, and in the case of hybrid alignment, the tilt angle between the first substrate or the second substrate and the liquid crystal composition is 85° to 90°, while the tilt angle between the other substrate and the liquid crystal composition is preferably 3° to 20°.

EXAMPLES

Hereinafter, the invention of the present application will be described in detail by way of Examples, but the invention of the present application is not intended to be limited to these Examples. Furthermore, the unit "percent (%)" for the compositions of the following Examples and Comparative Examples means "percent (%) by mass".

The properties of the liquid crystal composition will be indicated as follows.

$T_{N-i}$: Nematic phase-isotropic liquid phase transition temperature (° C.) as the upper limit temperature of the liquid crystal phase Δ∈: Dielectric anisotropy Δn: Refractive index anisotropy Vsat: Applied voltage at which the transmittance changes by 90% when square waves are applied at a frequency of 1 kHz τr+d/msec: response speed obtainable when a cell with $d_{ITO}$=10 μm, $d_{gap}$=10 μm, and an alignment film SE-5300 for both the first substrate and the second substrate, was used.

The following abbreviations are used for the indication of compounds.

| n (number) at the end | $C_nH_{2n+1}$— |
| --- | --- |
| -2- | —$CH_2CH_2$— |
| —1O— | —$CH_2O$— |
| —O1— | —$OCH_2$— |
| —V— | —CO— |
| —VO— | —COO— |
| —CFFO— | —$CF_2O$— |
| —F | —F |
| —Cl | —Cl |
| —CN | —C≡N |
| —OCFFF | —$OCF_3$ |
| —CFFF | —$CF_3$ |
| —OCFF | —$OCHF_2$ |
| —On | —$OC_nH_{2n+1}$ |
| -T- | —C≡C— |
| ndm- | $C_nH_{2n+1}$—HC═CH—$(CH_2)_{m-1}$— |

[Chemical Formula 17]

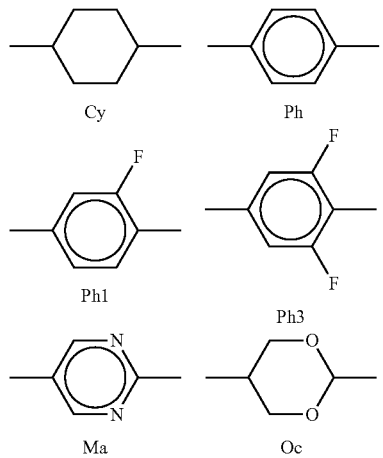

Example 1

Figure 4:
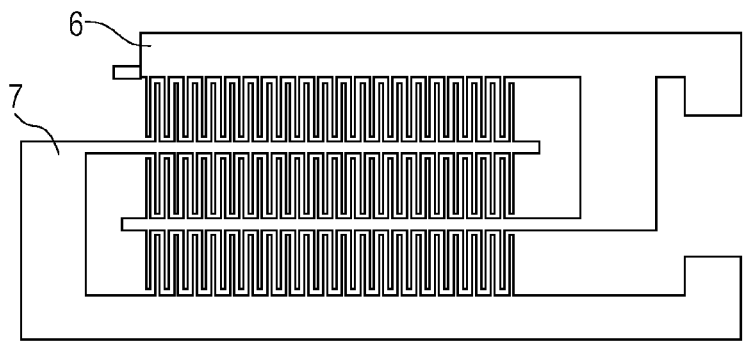
FIG. 4 is a diagram illustrating the electrode configuration of a test cell.
Figure 5:
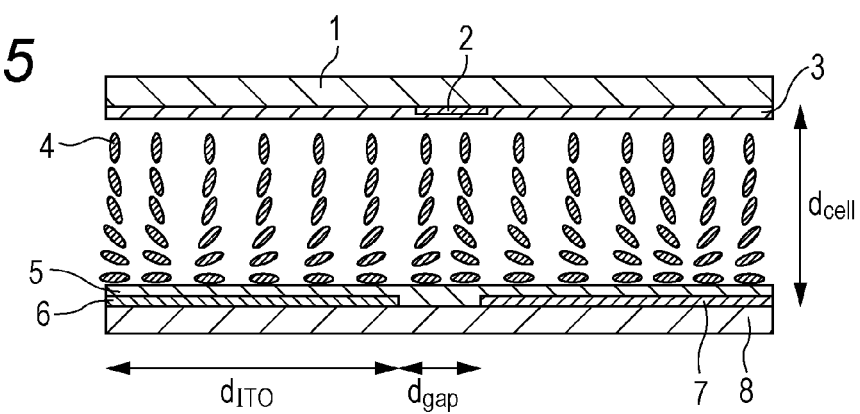
FIG. 5 is a diagram illustrating the state of alignment of liquid crystal molecules without voltage application (example 1 of p-HBIPS)
Figure 6:
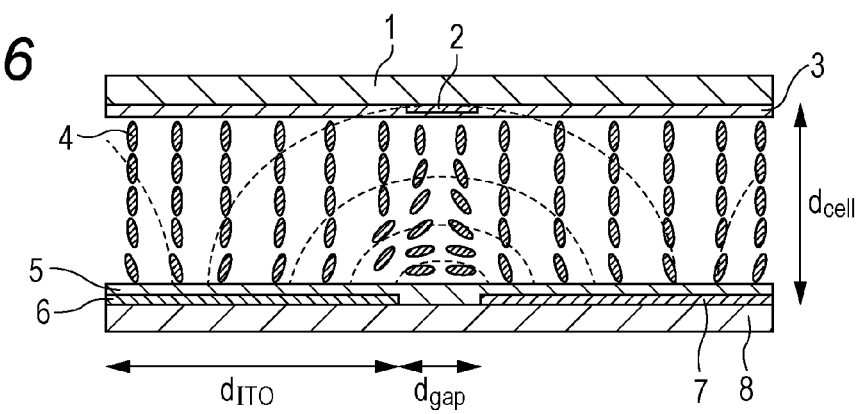
FIG. 6 is a diagram illustrating the state of realignment of liquid crystal molecules upon voltage application (example 1 of p-HBIPS)
Figure 7:
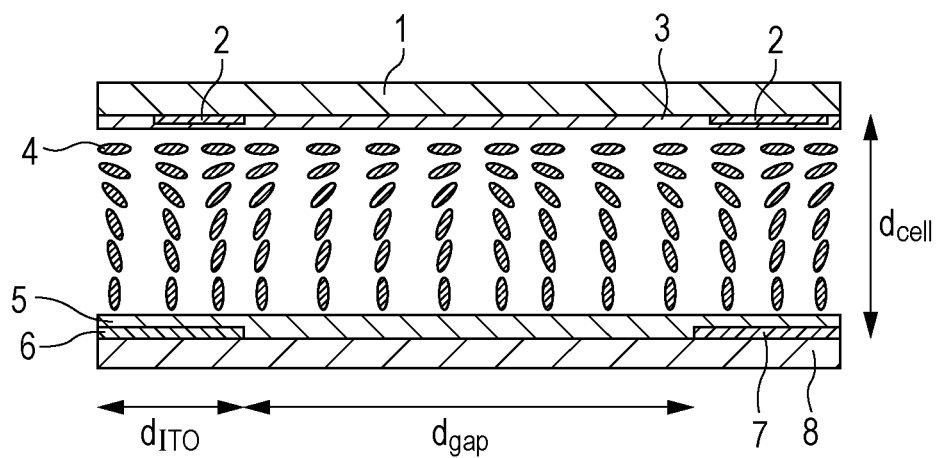
FIG. 7 is a diagram illustrating the state of alignment of liquid crystal molecules without voltage application (example 2 of p-HBIPS)
Figure 8:
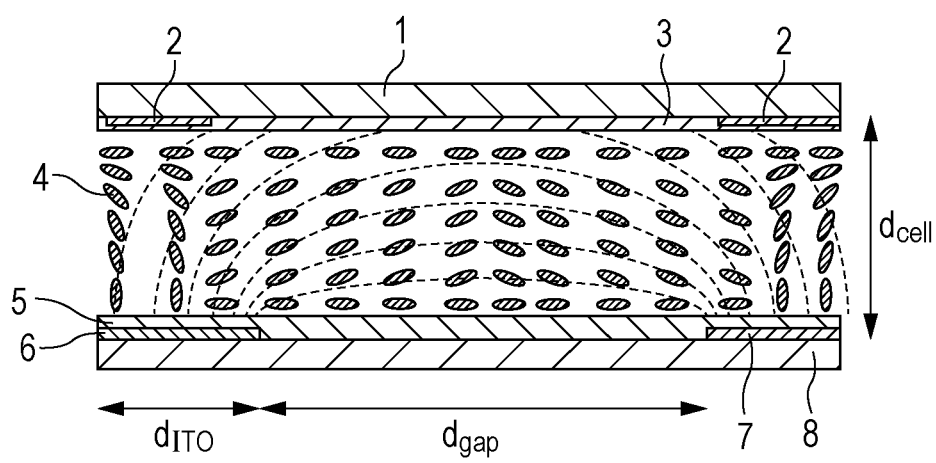
FIG. 8 is a diagram illustrating the state of realignment of liquid crystal molecules upon voltage application (example 2 of p-HBIPS).

An electrode structure such as illustrated in FIG. 4 was produced on a second substrate, and a first substrate having no electrode structure provided thereon was used. An alignment film of vertical orientation was formed on each of the respective surfaces that faced each other. The liquid crystal composition having positive dielectric anisotropy indicated in Table 1 was interposed between the first substrate and the second substrate, and thus a liquid crystal display device of Example 1 was produced (deer: 4.0 μm, $d_{ITO}$=10 μm, $d_{gap}$=10 μm, alignment film: SE-5300). The property values of this liquid crystal display device are presented together in Table 1.

Comparative Example 1

A conventional TN liquid crystal display device was produced using the liquid crystal composition used in Example 1, and the property values were measured. The results are presented together in Table 2.

The liquid crystal display device of the invention realized a higher response speed, a larger amount of light transmission, a reduction in light leakage caused by external pressure, a wider viewing angle, and a higher contrast ratio, as compared with the liquid crystal display device of Comparative Example 1 in which the same liquid crystals having positive dielectric anisotropy were interposed.

Example 2

An electrode structure such as illustrated in FIG. 4 was produced on a second substrate, and a first substrate having no electrode structure provided thereon was used. An alignment film of vertical alignment was formed on each of the other sides of the respective surfaces that faced each other, and an alignment film of horizontal orientation was formed on each of the reverse sides. The liquid crystal composition having positive dielectric anisotropy indicated in Table 1 were interposed between the first substrate and the second substrate, and thus a liquid crystal display device of Example 2 was produced ($d_{cell}$: 4.0 μm, $d_{ITO}$=10 μm, $d_{gap}$=10 μm, alignment film: SE-5300, AL-1051).

The liquid crystal display device realized a higher response speed, a larger amount of light transmission, a reduction in light leakage caused by external pressure, a wider viewing angle, and a higher contrast ratio, as compared with a conventional ECB liquid crystal display device in which the same liquid crystals having positive dielectric anisotropy were interposed.

Example 3

An electrode structure such as illustrated in FIG. 4 was produced on a second substrate, and a first substrate having no electrode structure provided thereon was used. An alignment film of vertical orientation was formed on each of the respective surfaces that faced each other. A composition obtained by adding 0.3% by mass of 2-methyl-acrylic acid 4'-{2-[4-(2-acryloyloxyethyl)phenoxycarbonyl]ethyl}biphenyl-4-yl ester to the liquid crystal composition having positive dielectric anisotropy indicated in Table 1 was interposed between the first substrate and the second substrate, and thus a liquid crystal display device of Example 3 was produced ($d_{cell}$: 4.0 μm, $d_{ITO}$=10 μm, $d_{gap}$=10 μm, alignment film: SE-5300). While a driving voltage was applied between the electrodes, ultraviolet radiation was irradiated for 600 seconds (3.0 J/cm²), and thus a polymerization treatment was carried out.

The liquid crystal display device realized a higher response speed, a larger amount of light transmission, a reduction in light leakage caused by external pressure, a wider viewing angle, and a higher contrast ratio, as compared with a conventional TN liquid crystal display device in which the same liquid crystals having positive dielectric anisotropy were interposed.

Example 4

An electrode structure such as illustrated in FIG. 4 was produced on a second substrate, and a first substrate having no electrode structure provided thereon was used. An alignment film of vertical orientation was formed on each of the other sides of the respective surfaces that faced each other. A composition obtained by adding 0.3% by mass of 2-methylacrylic acid 4'-{2-[4-(2-acryloyloxyethyl)phenoxycarbonyl]ethyl}biphenyl-4-yl ester to the liquid crystal composition having positive dielectric anisotropy indicated in Table 1 was interposed between the first substrate and the second substrate, and thus a liquid crystal display device of Example 4 was produced ($d_{cell}$: 4.0 µm, $d_{ITO}$=10 µm, $d_{gap}$=10 µm, alignment film: SE-5300, AL-1051). While a driving voltage was applied between the electrodes, ultraviolet radiation was irradiated for 600 seconds (3.0 J/cm²), and thus a polymerization treatment was carried out.

The liquid crystal display device realized a higher response speed, a larger amount of light transmission, a reduction in light leakage caused by external pressure, a wider viewing angle, and a higher contrast ratio, as compared with a conventional ECB liquid crystal display device in which the same liquid crystals having positive dielectric anisotropy were interposed.

TABLE 1

|  | Example 1 | Example 2 | Example 3 | Example 4 |
|---|---|---|---|---|
| 5-Cy-Ph-F | 5 | 5 | 5 | 5 |
| 7-Cy-Ph-F | 6 | 6 | 6 | 6 |
| 2-Cy-Cy-Ph-OCFFF | 11 | 11 | 11 | 11 |
| 3-Cy-Cy-Ph3-F | 12 | 12 | 12 | 12 |
| 3-Cy-Cy-Ph-OCFFF | 12 | 12 | 12 | 12 |
| 3-Cy-Ph-Ph1-OCFFF | 12 | 12 | 12 | 12 |
| 4-Cy-Cy-Ph-OCFFF | 10 | 10 | 10 | 10 |
| 5-Cy-Cy-Ph3-F | 9 | 9 | 9 | 9 |
| 5-Cy-Cy-Ph-OCFFF | 12 | 12 | 12 | 12 |
| 5-Cy-Ph-Ph3-F | 11 | 11 | 11 | 11 |
| Sum of composition ratios | 100 | 100 | 100 | 100 |
| Tni/° C. | 91.8 | 91.8 | 91.8 | 91.8 |
| Δn (20° C.) | 0.093 | 0.093 | 0.093 | 0.093 |
| Δε (20° C.) | 11.3 | 11.3 | 11.3 | 11.3 |
| Vsat/V (25° C.) | 4.4 | 4.2 | 4.3 | 4.2 |
| τr + d/msec (25° C., 6 V) | 7.2 | 7.6 | 7.8 | 8.0 |

Comparative Example 2

A liquid crystal display device of Comparative Example 2 was produced in the same manner as in Example 1 by interposing the liquid crystals having positive dielectric anisotropy indicated in Table 2, and the property values were measured. The results are presented in Table 2.

TABLE 2

|  | Comparative Example 1 | Comparative Example 2 |
|---|---|---|
| 5-Cy-Ph-F | 5 | 5 |
| 7-Cy-Ph-F | 6 | 6 |
| 2-Cy-Cy-Ph-OCFFF | 11 | 11 |
| 3-Cy-Cy-Ph3-F | 12 |  |
| 3-Cy-Cy-Ph1-OCFFF |  | 12 |
| 3-Cy-Cy-Ph-OCFFF | 12 | 12 |
| 3-Cy-Ph-Ph1-OCFFF | 12 |  |
| 4-Cy-Cy-Ph-OCFFF | 10 | 10 |
| 5-Cy-Cy-Ph3-F | 9 | 9 |
| 5-Cy-Cy-Ph-OCFFF | 12 | 12 |
| 5-Cy-Ph-Ph3-F | 11 |  |
| 3-Ph-VO-Ph1-CN |  | 11 |
| 3-Cy-Cy-Ph3-CN |  | 8 |
| 3-Cy-Oc-Ph3-F |  | 4 |
| Sum of composition ratios | 100 | 100 |
| Tni/° C. | 91.8 | 92.1 |
| Δn (20° C.) | 0.093 | 0.094 |
| Δε (20° C.) | 11.3 | 11.7 |
| Vsat/V (25° C.) | 3.9 | 5.6 |
| τr + d/msec (25° C., 6 V) | 17.6 | 11.7 |

The liquid crystal display device of Comparative Example 2 in which liquid crystals having positive dielectric anisotropy were interposed exhibited a slow response speed, a slightly smaller amount of light transmission, and particularly poor retention ratio and long-term reliability as compared with the liquid crystal display device of the invention.

Examples 5 to 7

A liquid crystal display device of Example 5 was produced in the same manner as in Example 1 by interposing the liquid crystals having positive dielectric anisotropy indicated in Table 3; a liquid crystal display device of Example 6 was produced in the same manner as in Example 1; and a liquid crystal display device of Example 7 was produced in the same manner as in Example 1.

TABLE 3

|  | Example 5 | Example 6 | Example 7 |
|---|---|---|---|
| 5-Cy-Ph-F | 5 | 5 | 6 |
| 7-Cy-Ph-F | 6 | 6 | 6 |
| 2-Cy-Cy-Ph-OCFFF | 11 | 11 | 11 |
| 3-Cy-Cy-Ph1-F | 12 |  |  |
| 3-Cy-Cy-Ph1-OCFFF |  |  | 9 |
| 3-Cy-Cy-Ph3-F |  |  |  |
| 3-Cy-Cy-Ph3-OCFFF |  | 12 |  |
| 3-Cy-Cy-Ph-OCFFF | 12 | 12 | 12 |
| 3-Cy-Ph-Ph1-F |  |  | 14 |
| 3-Cy-Ph-Ph1-OCFFF | 12 | 12 |  |
| 4-Cy-Cy-Ph-OCFFF | 10 | 10 | 10 |
| 5-Cy-Cy-Ph1-F | 9 |  |  |
| 5-Cy-Cy-Ph1-OCFFF |  |  | 10 |
| 5-Cy-Cy-Ph3-F |  |  |  |
| 5-Cy-Cy-Ph3-OCFFF |  | 9 |  |
| 5-Cy-Cy-Ph-OCFFF | 12 | 12 | 10 |
| 5-Cy-Ph-Ph1-F |  |  | 12 |
| 5-Cy-Ph-Ph1-OCFFF | 11 | 11 |  |
| 5-Cy-Ph-Ph3-F |  |  |  |
| 3-Ph-VO-Ph1-CN |  |  |  |
| 3-Cy-Cy-Ph3-CN |  |  |  |
| 3-Cy-Oc-Ph3-F |  |  |  |
| Sum of composition ratios | 100 | 100 | 100 |
| Tni/° C. | 96.1 | 98.9 | 97.6 |
| Δn (20° C.) | 0.091 | 0.096 | 0.096 |
| Δε (20° C.) | 10.4 | 10.5 | 8.6 |
| Vsat/V (25° C.) | 4.5 | 5.2 | 5.8 |
| τr + d/msec (25° C., 6 V) | 7.4 | 6.9 | 6.7 |

The liquid crystal display devices of Examples 5 to 7 realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 8 to 10

A liquid crystal display device of Example 8 was produced in the same manner as in Example 1 by interposing the liquid crystals having positive dielectric anisotropy indicated in Table 4; a liquid crystal display device of Example 9 was produced in the same manner as in Example 1; and a liquid crystal display device of Example 10 was produced in the same manner as in Example 1.

TABLE 4

|  | Example 8 | Example 9 | Example 10 |
|---|---|---|---|
| 5-Cy-Ph-F | 5 | 5 | 5 |
| 7-Cy-Ph-F | 6 | 6 | 6 |
| 2-Cy-Cy-Ph1-F |  | 12 | 12 |
| 3-Cy-Cy-Ph1-F | 12 | 10 | 10 |
| 3-Cy-Cy-Ph1-OCFFF | 12 | 12 | 12 |
| 3-Cy-Cy-Ph-OCFFF | 12 |  |  |
| 3-Cy-Ph-Ph1-OCFFF | 12 | 12 | 12 |
| 4-Cy-Cy-Ph1-F |  | 12 | 12 |
| 5-Cy-Cy-Ph1-F | 11 | 11 | 11 |
| 5-Cy-Cy-Ph1-OCFFF | 9 | 9 | 9 |
| 5-Cy-Cy-Ph-OCFFF | 10 |  |  |
| 5-Cy-Ph-Ph1-OCFFF | 11 | 11 | 11 |
| Sum of composition ratios | 100 | 100 | 100 |
| Tni/° C. | 91.1 | 83.5 | 86.8 |
| Δn (20° C.) | 0.092 | 0.089 | 0.092 |
| Δε (20° C.) | 9.9 | 8.3 | 7.9 |
| Vsat/V (25° C.) | 4.7 | 5.3 | 5.6 |
| τr + d/msec (25° C., 6 V) | 7.1 | 7.5 | 7.9 |

The liquid crystal display devices of Examples 8 to 10 realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 11 to 13

A liquid crystal display device of Example 11 was produced in the same manner as in Example 1 by interposing the liquid crystals having positive dielectric anisotropy indicated in Table 5; a liquid crystal display device of Example 12 was produced in the same manner as in Example 1; and a liquid crystal display device of Example 13 was produced in the same manner as in Example 1.

TABLE 5

|  | Example 11 | Example 12 | Example 13 |
|---|---|---|---|
| 5-Cy-2-Ph1-F |  |  | 5 |
| 5-Cy-Ph-F |  |  | 10 |
| 5-Ph1-Ph-OCFFF | 8 |  |  |
| 7-Cy-2-Ph1-F |  |  | 5 |
| 7-Cy-Ph3-F |  |  | 8 |
| 7-Cy-Ph-F |  |  | 15 |
| 7-Ph1-Ph-OCFFF | 7 |  |  |
| 2-Cy-Cy-Ph-OCFFF | 13 | 9 |  |
| 3-Cy-2-Cy-Ph3-F |  |  | 10 |
| 3-Cy-Cy-2-Ph3-F |  |  | 10 |
| 3-Cy-Cy-Ph3-F | 12 |  | 6 |
| 3-Cy-Cy-Ph-OCFFF | 15 | 12 |  |
| 3-Cy-Ph1-OCFF |  | 7 |  |
| 3-Cy-Ph-CFFO-Ph3-F |  |  | 5 |
| 3-Cy-Ph-CFFO-Ph-OCFFF |  |  | 5 |
| 3-Cy-Ph-Ph1-F |  |  | 13 |

TABLE 5-continued

|  | Example 11 | Example 12 | Example 13 |
|---|---|---|---|
| 3-Cy-Ph-Ph1-OCFF |  | 8 |  |
| 3-Cy-Ph-Ph3-F | 9 |  | 5 |
| 4-Cy-2-Cy-Ph3-F |  |  | 6 |
| 4-Cy-Cy-Ph3-F |  |  | 3 |
| 4-Cy-Cy-Ph-OCFFF | 13 |  |  |
| 5-Cy-2-Cy-Ph3-F |  |  | 6 |
| 5-Cy-Cy-2-Ph3-F |  |  | 5 |
| 5-Cy-Cy-Ph3-F | 9 |  |  |
| 5-Cy-Cy-Ph-OCFFF | 14 | 12 |  |
| 5-Cy-Ph-CFFO-Ph1-F |  |  | 5 |
| 5-Cy-Ph-CFFO-Ph3-F |  |  | 10 |
| 5-Cy-Ph-CFFO-Ph-CF3 |  |  | 5 |
| 5-Cy-Ph-Ph3-F |  |  | 5 |
| 3-Cy-Cy-2-Ph-Ph3-F |  |  | 3 |
| 3-Cy-Cy-Ph1-Ph-F |  | 4 |  |
| 3-Cy-Cy-Ph-Ph3-F |  |  | 3 |
| Sum of composition ratios | 100 | 100 | 100 |
| Tni/° C. | 79.8 | 65.1 | 61.7 |
| Δn (20° C.) | 0.0876 | 0.0995 | 0.0827 |
| Δε (20° C.) | 8.7 | 7.6 | 7.3 |
| Vsat/V (25° C.) | 5.2 | 5.8 | 5.4 |
| τr + d/msec (25° C., 6 V) | 7.1 | 6.7 | 6.2 |

The liquid crystal display devices of Examples 11 to 13 realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 14 to 17

A liquid crystal display device of Example 14 was produced in the same manner as in Example 1 by interposing the liquid crystals having positive dielectric anisotropy indicated in Table 6; a liquid crystal display device of Example 15 was produced in the same manner as in Example 1; a liquid crystal display device of Example 16 was produced in the same manner as in Example 1; and a liquid crystal display device of Example 17 was produced in the same manner as in Example 1 by interposing the liquid crystals having positive dielectric anisotropy indicated in Table 7.

TABLE 6

|  | Example 14 | Example 15 | Example 16 |
|---|---|---|---|
| 3-Cy-2-Ph1-Cl | 5 |  |  |
| 3-Cy-Ph1-Cl |  |  | 11 |
| 5-Cy-2-Ph1-Cl | 5 |  |  |
| 5-Cy-Ph1-Cl |  |  | 10 |
| 2-Cy-Cy-Ph3-Cl |  | 10 |  |
| 3-Cy-Cy-Ph3-Cl |  | 9 |  |
| 3-Cy-Cy-Ph-Cl |  |  |  |
| 5-Cy-Cy-Ph3-Cl |  | 11 |  |
| 5-Cy-Ph-F | 11 | 7 |  |
| 6-Cy-Ph-F |  | 4 |  |
| 7-Cy-Ph-F | 13 | 6 | 10 |
| 2-Cy-Cy-Ph-OCFFF | 9 | 9 | 9 |
| 3-Cy-Cy-Ph-OCFFF | 12 | 11 | 12 |
| 3-Cy-Ph1-Ph-CFFF | 5 |  | 5 |
| 3-Cy-Ph1-Ph-F |  |  | 10 |
| 3-Cy-Ph1-Ph-OCFFF |  | 12 |  |
| 4-Cy-Cy-Ph-OCFFF | 7 |  | 7 |
| 5-Cy-Cy-Ph-OCFFF | 12 | 12 | 12 |
| 5-Cy-Ph1-Ph-CFFF | 5 |  |  |
| 5-Cy-Ph1-Ph-OCFFF |  | 9 |  |
| 5-Cy-Ph-Ph1-F | 13 |  | 8 |

TABLE 6-continued

|  | Example 14 | Example 15 | Example 16 |
|---|---|---|---|
| 2-Cy-Cy-Ph1-Ph-F | 3 | | |
| 3-Cy-Cy-Ph1-Ph-F | | | 3 |
| 5-Cy-Cy-Ph1-Ph-F | | | 3 |
| Sum of composition ratios | 100 | 100 | 100 |
| Tni/° C. | 65.8 | 86.2 | 70.7 |
| Δn (20° C.) | 0.0825 | 0.0923 | 0.0992 |
| Δε (20° C.) | 7.5 | 6.2 | 6.9 |
| Vsat/V (25° C.) | 5.2 | 6.1 | 4.7 |
| τr + d/msec (25° C., 6 V) | 7.3 | 6.9 | 7.2 |

TABLE 7

|  | Example 17 |
|---|---|
| 3-Cy-Cy-Ph-C1 | 4 |
| 5-Cy-Cy-Ph-C1 | 4 |
| 2-Cy-Ph-Ph1-F | 3 |
| 2-Cy-Ph-Ph-F | 3 |
| 3-Cy-2-Cy-Ph3-F | 6 |
| 3-Cy-Cy-2-Ph3-F | 12 |
| 3-Cy-Cy-Ph3-F | 3 |
| 3-Cy-Ph-CFFO-Ph-OCFFF | 5 |
| 3-Cy-Ph-Ph1-F | 3 |
| 3-Cy-Ph-Ph3-F | 6 |
| 3-Cy-Ph-Ph-F | 3 |
| 4-Cy-2-Cy-Ph3-F | 6 |
| 4-Cy-Cy-Ph3-F | 3 |
| 5-Cy-2-Cy-Ph3-F | 6 |
| 5-Cy-Cy-2-Ph3-F | 6 |
| 5-Cy-Ph-CFFO-Ph3-F | 10 |
| 5-Cy-Ph-CFFO-Ph-CF3 | 5 |
| 5-Cy-Ph-Ph1-F | 6 |
| 5-Cy-Ph-Ph3-F | 6 |
| Sum of composition ratios | 100 |
| Tni/° C. | 82.4 |
| Δn (20° C.) | 0.0998 |
| Δε (20° C.) | 10.9 |
| Vsat/V (25° C.) | 4.3 |
| τr + d/msec (25° C., 6 V) | 7.1 |

The liquid crystal display devices realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 18 to 21

A liquid crystal display device of Example 18 was produced in the same manner as in Example 1 by interposing the liquid crystals having positive dielectric anisotropy indicated in Table 8; a liquid crystal display device of Example 19 was produced in the same manner as in Example 1; a liquid crystal display device of Example 20 was produced in the same manner as in Example 1; and a liquid crystal display device of Example 21 was produced in the same manner as in Example 1 except that $d_{cell}$: 3.0 μm, $d_{ITO}$=10 μm, $d_{gap}$=10 μm.

TABLE 8

|  | Example 18 | Example 19 | Example 20 | Example 21 |
|---|---|---|---|---|
| 3-Cy-Ph-C1 | | | | 4 |
| 5-Cy-Ph-C1 | | | | 4 |
| 7-Cy-Ph-C1 | | | | 5 |
| 2-Cy-Cy-Ph-C1 | | | | 6 |
| 3-Cy-2-Cy-Ph1-C1 | | | | 3 |
| 3-Cy-Cy-Ph-C1 | | | | 7 |
| 5-Cy-Cy-Ph-C1 | | | | 6 |
| 3-Cy-Ph-OCFFF | 4 | 4 | | |
| 3-Ph-Ph-OCFFF | | | 8 | |
| 4-Cy-Ph-OCFFF | 6 | 6 | | |
| 5-Cy-Ph-OCFFF | 7 | 7 | | |
| 5-Ph-Ph-OCFFF | | | 13 | |
| 7-Ph-Ph-OCFFF | | | 13 | |
| 2-Cy-Cy-Ph-OCFFF | | | 8 | |
| 2-Cy-Ph-Ph1-F | 8 | 8 | | 6 |
| 3-Cy-Cy-Ph-OCFFF | | | 13 | |
| 3-Cy-Ph1-Ph-CFFF | | 9 | | |
| 3-Cy-Ph1-Ph-F | 12 | 12 | | |
| 3-Cy-Ph1-Ph-OCFFF | 9 | | | |
| 3-Cy-Ph-CFFO-Ph3-F | | | | 5 |
| 3-Cy-Ph-CFFO-Ph-OCFFF | | | | 5 |
| 3-Cy-Ph-Ph1-F | | | 14 | 6 |
| 3-Cy-Ph-Ph3-F | 12 | 12 | | 13 |
| 4-Cy-Cy-Ph-OCFFF | | | 5 | |
| 4-Cy-Ph-Ph3-F | 10 | 10 | | |
| 5-Cy-Cy-Ph-OCFFF | | | 12 | |
| 5-Cy-Ph1-Ph-CFFF | | 11 | | |
| 5-Cy-Ph1-Ph-OCFFF | 11 | | | |
| 5-Cy-Ph-Ph1-F | 10 | 10 | 14 | 12 |
| 5-Cy-Ph-Ph3-F | 11 | 11 | | 13 |
| 3-Cy-Ph1-T-Ph-2 | | | | 3 |
| 3-Cy-Ph1-V-Ph-2 | | | | 2 |
| Sum of composition ratios | 100 | 100 | 100 | 100 |
| Tni/° C. | 65.9 | 61.7 | 65.6 | 89.1 |
| Δn (20° C.) | 0.1116 | 0.1155 | 0.117 | 0.1274 |
| Δε (20° C.) | 5.9 | 7.3 | 10.5 | 6.2 |
| Vsat/V (25° C.) | 6.8 | 9.8 | 6.8 | 10.1 |
| τr + d/msec (25° C., 6 V) | 4.6 | 4.4 | 4.3 | 4.1 |

The liquid crystal display devices realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 22 and 23

A liquid crystal display device of Example 22 was produced in the same manner as in Example 1 by interposing the liquid crystals having positive dielectric anisotropy indicated in Table 9; and a liquid crystal display device of Example 23 was produced in the same manner as in Example 1 except that $d_{cell}$: 3.5 μm, $d_{ITO}$=10 μm, $d_{gap}$=10 μm.

TABLE 9

|  | Example 22 | Example 23 |
|---|---|---|
| 5-Cy-Ph-F | 6 | 5 |
| 7-Cy-Ph-F | 6 | 6 |
| 2-Cy-Ph-Ph1-F | 8 | |
| 3-Cy-2-Cy-Ph-OCFFF | 8 | |
| 3-Cy-Cy-2-Ph-OCFFF | 8 | |
| 3-Cy-Cy-Ph1-OCFFF | | 12 |
| 3-Cy-Cy-Ph-OCFFF | | 12 |
| 3-Cy-Ph-CFFO-Ph3-F | 3 | |
| 3-Cy-Ph-CFFO-Ph-OCFFF | 5 | |

TABLE 9-continued

|  | Example 22 | Example 23 |
|---|---|---|
| 3-Cy-Ph-Ph1-F | 8 | 12 |
| 3-Cy-Ph-Ph1-OCFFF |  | 12 |
| 5-Cy-2-Cy-Ph-OCFFF | 8 |  |
| 5-Cy-Cy-2-Ph-OCFFF | 8 |  |
| 5-Cy-Cy-Ph1-OCFFF |  | 9 |
| 5-Cy-Cy-Ph-OCFFF | 8 | 10 |
| 5-Cy-Ph-CFFO-Ph3-F | 8 |  |
| 5-Cy-Ph-Ph1-F | 16 | 11 |
| 5-Cy-Ph-Ph1-OCFFF |  | 11 |
| Sum of composition ratios | 100 | 100 |
| Tni/° C. | 84.5 | 89.3 |
| Δn (20° C.) | 0.1004 | 0.105 |
| Δε (20° C.) | 6.3 | 9.7 |
| Vsat/V (25° C.) | 7.6 | 6.9 |
| τr + d/msec (25° C., 6 V) | 6.9 | 6.4 |

The liquid crystal display devices of Examples 22 and 23 realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 24 and 25

A liquid crystal display device of Example 24 was produced in the same manner as in Example 1 by interposing the liquid crystals having positive dielectric anisotropy indicated in Table 10; and a liquid crystal display device of Example 25 was produced in the same manner as in Example 1.

TABLE 10

|  | Example 24 | Example 25 |
|---|---|---|
| 3-Ph1-Ph-C1 |  | 6 |
| 5-Ph1-Ph-C1 |  | 7 |
| 2-Cy-Ph-Ph3-C1 | 5 | 5 |
| 3-Cy-Ph-Ph3-C1 | 9 | 9 |
| 5-Cy-Ph-Ph3-C1 | 11 | 11 |
| 3-Ph-Ph1-F | 6 |  |
| 5-Ph-Ph1-F | 7 |  |
| 2-Cy-Ph-Ph1-F | 8 | 8 |
| 3-Cy-2-Ph-Ph1-F | 11 | 11 |
| 3-Cy-Ph-Ph1-F | 12 | 12 |
| 4-Cy-2-Ph-Ph1-F | 10 | 10 |
| 5-Cy-2-Ph-Ph1-F | 11 | 11 |
| 5-Cy-Ph-Ph1-F | 10 | 10 |
| Sum of composition ratios | 100 | 100 |
| Tni/° C. | 85.3 | 83.1 |
| Δn (20° C.) | 0.1474 | 0.1582 |
| Δε (20° C.) | 5.9 | 5.4 |
| Vsat/V (25° C.) | 13.8 | 14.7 |
| τr + d/msec (25° C., 6 V) | 3.2 | 3.5 |

The liquid crystal display devices of Examples 24 and 25 realized higher response speeds, larger amounts of light transmission, a reduction in light leakage caused by external pressure, wider viewing angles, and higher contrast ratios, as compared with conventional TN liquid crystal display devices in which the same liquid crystals having positive dielectric anisotropy were interposed.

Examples 26 to 28

The liquid crystal compositions having positive dielectric anisotropy used in Example 5, 12 and 17 were each interposed in a cell with $d_{ITO}=4$ μm and $d_{gap}=4$ μm, and thus liquid crystal display devices of Examples 26 to 28 were produced. Their response speeds were measured, and the following results were obtained.

Example 26: τr+d=1.6 msec (liquid crystal composition of Example 5)

Example 27: τr+d=1.3 msec (liquid crystal composition of Example 12)

Example 28: τr+d=0.9 msec (liquid crystal composition of Example 17)

The liquid crystal display devices of Examples 26 to 28 exhibited characteristics of very fast responses. Furthermore, a pressing pressure was applied to the liquid crystal display devices produced in these Examples, but the light leakage that occurs in conventional VA displays was hardly observed.

Examples 29 to 32

An electrode structure such as illustrated in FIG. 4 was produced on a second substrate, and a first substrate having no electrode structure provided thereon was used. An alignment film of vertical orientation was formed on each of the respective surfaces that faced each other. The liquid crystals having positive dielectric anisotropy indicated in Table 11 were interposed between the first substrate and the second substrate, and thus liquid crystal panels were produced ($d_{ITO}=4$ μm, $d_{gap}=4$ μm, alignment film: SE-5300).

TABLE 11

|  | Example 29 | Example 30 | Example 31 | Example 32 |
|---|---|---|---|---|
| 5-Cy-Ph-F | 5 |  |  |  |
| 7-Cy-Ph3-F |  | 10 |  |  |
| 7-Cy-Ph-F | 6 |  |  |  |
| 2-Cy-Cy-Ph1-OCFF |  |  | 8 |  |
| 2-Cy-Cy-Ph-OCFFF |  |  |  | 15 |
| 3-Cy-Cy-2-Ph3-F |  |  | 7 |  |
| 3-Cy-Cy-Ph1-F |  | 10 |  |  |
| 3-Cy-Cy-Ph3-F | 16 | 12 | 12 |  |
| 3-Cy-Cy-Ph3-OCFFF |  |  | 12 |  |
| 3-Cy-Cy-Ph-OCFFF | 10 |  |  | 18 |
| 3-Cy-Ph-Ph1-F |  |  |  | 18 |
| 3-Cy-Ph-Ph1-OCFFF | 15 | 10 |  |  |
| 3-Cy-Ph-Ph3-F |  |  | 15 |  |
| 4-Cy-Cy-Ph3-F |  | 13 |  |  |
| 4-Cy-Cy-Ph-OCFFF | 10 |  |  | 12 |
| 4-Cy-Ph-Ph3-F |  |  | 12 |  |
| 5-Cy-Cy-Ph1-F |  | 10 |  |  |
| 5-Cy-Cy-Ph1-OCFFF |  | 9 |  |  |
| 5-Cy-Cy-Ph3-F | 12 | 5 | 9 |  |
| 5-Cy-Cy-Ph-OCFFF | 10 |  | 14 | 12 |
| 5-Cy-Ph-Ph1-F |  |  |  | 14 |
| 5-Cy-Ph-Ph1-OCFFF |  | 11 |  |  |
| 5-Cy-Ph-Ph3-F | 11 |  |  |  |
| 2-Ph-T-Ph-1 | 5 | 5 | 5 | 5 |
| 2-Ph-T-Ph-O1 |  | 5 |  |  |
| 3-Cy-Cy-4 |  |  |  | 6 |
| 3-Cy-Ph1-Ph-Cy-3 |  |  | 6 |  |
| Sum of composition ratios | 100 | 100 | 100 | 100 |
| Tni/° C. | 91.9 | 86.1 | 79.1 | 65.3 |
| Δn (20° C.) | 0.1090 | 0.114 | 0.101 | 0.1161 |
| Δε (20° C.) | 11.4 | 10.4 | 10.1 | 10.4 |
| K3/K1 (20° C.) | 1.33 | 1.30 | 1.29 | 1.32 |
| K3/pN (20° C.) | 14.9 | 14.8 | 14.3 | 15.1 |
| K1/pN (20° C.) | 11.2 | 11.4 | 11.1 | 11.4 |
| Vsat/V (25° C.) | 8.9 | 9.6 | 10.1 | 10.3 |
| τr + d/msec (25° C.) | 1.23 | 1.16 | 1.08 | 1.10 |

The liquid crystal panels in which the liquid crystals having positive dielectric anisotropy disclosed in Examples 29 to 32 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Comparative Example 3

A liquid crystal panel of Comparative Example 3 was produced in the same manner as in Example 29 by interposing the liquid crystals having positive dielectric anisotropy indicated in Table 12, and the property values were measured. The results are presented in Table 12.

TABLE 12

|  | Comparative Example 3 |
|---|---|
| 5-Cy-Ph-F | 5 |
| 7-Cy-Ph-F | 6 |
| 2-Cy-Cy-Ph-OCFFF | 11 |
| 3-Cy-Cy-Ph1-OCFFF | 12 |
| 3-Cy-Cy-Ph-OCFFF | 12 |
| 4-Cy-Cy-Ph-OCFFF | 10 |
| 5-Cy-Cy-Ph3-F | 9 |
| 5-Cy-Cy-Ph-OCFFF | 12 |
| 3-Ph-VO-Ph1-CN | 11 |
| 3-Cy-Cy-Ph3-CN | 8 |
| 3-Cy-Oc-Ph3-F | 4 |
| Sum of composition ratios | 100 |
| Tni/° C. | 92.1 |
| Δn (20° C.) | 0.094 |
| Δε (20° C.) | 11.7 |
| Vsat/V (25° C.) | 5.6 |
| τr + d/msec (25° C., 6 V) | 3.7 |

The liquid crystal panel of Comparative Example 3 in which liquid crystals having positive dielectric anisotropy were interposed, exhibited a slow response speed, a slightly smaller amount of light transmission, and particularly poor retention ratio and long-term reliability as compared with the liquid crystal panels of the invention.

Examples 33 to 35

The liquid crystals having positive dielectric anisotropy indicated in Table 13 were interposed between a first substrate and a second substrate in the same manner as in Example 29 and Comparative Example 3, and thus liquid crystal panels were produced.

The liquid crystal panels in which the liquid crystals having positive dielectric anisotropy disclosed in Examples 33 to 35 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

TABLE 13

|  | Example 33 | Example 34 | Example 35 |
|---|---|---|---|
| 5-Cy-Ph-F | 5 | 5 |  |
| 5-Ph-Ph1-F |  |  | 5 |
| 7-Cy-Ph-F | 6 | 6 |  |
| 7-Ph1-Ph-OCFFF |  |  | 6 |
| 2-Cy-Cy-Ph-OCFFF | 11 | 11 | 11 |
| 3-Cy-Cy-Ph1-F | 12 |  |  |
| 3-Cy-Cy-Ph3-OCFFF |  | 12 |  |
| 3-Cy-Cy-Ph-OCFFF | 12 | 12 | 10 |
| 3-Cy-Ph-Ph1-F |  |  | 14 |
| 4-Cy-Cy-Ph-OCFFF | 10 | 10 | 10 |
| 5-Cy-Cy-Ph1-OCFFF |  |  | 9 |
| 5-Cy-Cy-Ph-OCFFF | 12 | 12 | 6 |
| 5-Cy-Ph-Ph1-F |  |  | 11 |
| 5-Cy-Ph-Ph1-OCFFF | 11 | 11 |  |
| 3-Ph-Ph-Ph3-F | 11 | 11 | 6 |
| 3-Ph-Ph1-Ph3-F | 10 |  | 5 |
| 5-Ph-Ph1-Ph3-F |  | 10 |  |
| 5-Ph-Ph3-Ph1-F |  |  | 5 |
| 5-Cy-Ph1-Ph-Cy-3 |  |  | 2 |
| Sum of composition ratios | 100 | 100 | 100 |
| Tni/° C. | 92.8 | 98.9 | 96.4 |
| Δn (20°) | 0.1193 | 0.1204 | 0.1086 |
| Δε (20° C.) | 12.6 | 13.1 | 10.1 |
| K3/K1 (20° C.) | 1.52 | 1.56 | 1.40 |
| K3/pN (20° C.) | 17.3 | 17.6 | 15.8 |
| K1/pN (20° C.) | 11.4 | 11.3 | 11.3 |
| Vsat/V (25° C.) | 6.7 | 6.1 | 9.9 |
| τr + d/msec (25° C.) | 1.14 | 1.03 | 1.07 |

Examples 36 to 38

The liquid crystals having positive dielectric anisotropy indicated in Table 14 were interposed between a first substrate and a second substrate in the same manner as in Example 29 and Comparative Example 3, and thus liquid crystal panels were produced.

The liquid crystal panels in which the liquid crystals having positive dielectric anisotropy disclosed in Examples 36 to 38 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

TABLE 14

|  | Example 36 | Example 37 | Example 38 |
|---|---|---|---|
| 5-Ph1-Ph-OCFFF |  |  | 5 |
| 5-Ph-Ph1-F |  | 5 | 10 |
| 5-Ph-Ph-OCFFF | 5 |  |  |
| 7-Cy-2-Ph1-F |  |  | 5 |
| 7-Ph1-Ph-OCFFF |  | 6 | 15 |
| 7-Ph-Ph-OCFFF | 6 |  |  |
| 3-Cy-Cy-Ph1-F | 12 | 10 |  |
| 3-Cy-Cy-Ph1-OCFFF | 12 | 12 |  |
| 3-Cy-Cy-Ph-OCFFF |  |  | 12 |
| 3-Cy-Ph1-Ph-OCFF |  |  | 7 |
| 3-Cy-Ph-Ph1-F |  |  | 13 |
| 3-Cy-Ph-Ph1-OCFF |  |  | 8 |
| 3-Cy-Ph-Ph1-OCFFF | 12 | 12 |  |
| 5-Cy-Cy-Ph1-F | 11 | 11 |  |
| 5-Cy-Cy-Ph1-OCFFF | 9 | 9 |  |
| 5-Cy-Ph-Ph1-OCFFF | 11 | 11 |  |
| 3-Ph-Ph-Ph3-F |  |  | 9 |
| 3-Ph-Ph1-Ph3-F | 12 | 12 |  |
| 3-Ph-Ph3-Ph1-F |  |  | 12 |
| 5-Ph-Ph3-Ph1-F | 10 | 12 |  |
| 3-Cy-Cy-Ph1-Ph-F |  |  | 4 |
| Sum of composition ratios | 100 | 100 | 100 |
| Tni/° C. | 91.1 | 83.5 | 61.3 |
| Δn (20° C.) | 0.1118 | 0.1102 | 0.1325 |
| Δε (20° C.) | 11.7 | 10.9 | 15.7 |

TABLE 14-continued

|  | Example 36 | Example 37 | Example 38 |
|---|---|---|---|
| K3/K1 (20° C.) | 1.37 | 1.38 | 1.38 |
| K3/pN (20° C.) | 14.9 | 14.9 | 15.3 |
| K1/pN (20° C.) | 10.9 | 10.8 | 11.1 |
| Vsat/V (25° C.) | 8.4 | 9.3 | 5.4 |
| τr + d/msec (25° C.) | 1.13 | 1.12 | 0.95 |

Example 39

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. The liquid crystals having positive dielectric anisotropy disclosed in Examples 29 to 38 and Comparative Example 3 were respectively interposed between the first substrate and the second substrate, and thus liquid crystal panels were produced ($d_{ITO}$=4 μm, $d_{gap}$=4 μm, alignment film: SE-5300, AL-1051).

The liquid crystal panels in which the liquid crystals having positive dielectric anisotropy disclosed in Examples 29 to 38 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 3 were interposed.

Example 40

An electrode structure such as illustrated in FIG. 4 was produced on a second substrate, and a first substrate having no electrode structure provided thereon was used. An alignment film of vertical orientation was formed on each of the respective surfaces that faced each other. Compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 29 to 38 and Comparative Example 3 were interposed between the first substrate and the second substrate, and thus liquid crystal panels were produced ($d_{ITO}$=4 μm, $d_{gap}$=4 μm, alignment film: SE-5300). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 29 to 38 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 3 were interposed.

Example 41

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. Each of the compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 29 to 38 and Comparative Example 3 was interposed between the first substrate and the second substrate, and thus liquid crystal panels were produced ($d_{ITO}$=4 μm, $d_{gap}$=4 μm, alignment film: SE-5300, AL-1051). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 29 to 38 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 1 were interposed.

Examples 42 to 45

An electrode structure as illustrated in FIG. 4 was produced on a second substrate, and a first substrate having no electrode structure provided thereon was used. An alignment film of vertical orientation was formed on each of the respective surfaces that faced each other. The liquid crystals having positive dielectric anisotropy indicated in Table 15 were respectively interposed between the first substrate and the second substrate, and thus liquid crystal panels were produced ($d_{ITO}$=4 μm, $d_{gap}$=4 μm, alignment film: SE-5300).

The liquid crystal panels in which the liquid crystals having positive dielectric anisotropy disclosed in Examples 42 to 45 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

TABLE 15

|  | Example 42 | Example 43 | Example 44 | Example 45 |
|---|---|---|---|---|
| 3-Ph-Ph-OCFFF |  |  |  | 8 |
| 5-Cy-Ph-F | 5 |  |  |  |
| 5-Ph1-Ph-OCFFF |  |  | 8 |  |
| 5-Ph-Ph-OCFFF |  |  |  | 13 |
| 7-Cy-Ph3-F |  | 8 |  |  |
| 7-Cy-Ph-F | 6 |  |  |  |
| 7-Ph1-Ph-OCFFF |  |  | 8 |  |
| 7-Ph-Ph-OCFFF |  |  |  | 13 |
| 2-Cy-Cy-Ph-OCFFF | 11 |  |  | 8 |
| 3-Cy-Cy-Ph1-F |  | 10 |  |  |
| 3-Cy-Cy-Ph3-F | 12 |  | 16 |  |
| 3-Cy-Cy-Ph3-OCFFF |  |  | 12 |  |
| 3-Cy-Cy-Ph-OCFFF | 12 |  |  | 13 |
| 3-Cy-Ph-Ph1-F |  |  |  | 14 |
| 3-Cy-Ph-Ph1-OCFFF | 12 | 10 |  |  |
| 3-Cy-Ph-Ph3-F |  |  | 15 |  |
| 4-Cy-Cy-Ph3-F |  | 6 |  |  |
| 4-Cy-Cy-Ph-OCFFF | 10 |  |  | 5 |
| 4-Cy-Ph-Ph3-F |  |  | 12 |  |
| 5-Cy-Cy-Ph1-F |  | 8 |  |  |
| 5-Cy-Cy-Ph1-OCFFF |  | 7 |  |  |
| 5-Cy-Cy-Ph3-F |  |  | 9 |  |
| 5-Cy-Cy-Ph-OCFFF |  |  | 14 | 12 |

TABLE 15-continued

|  | Example 42 | Example 43 | Example 44 | Example 45 |
|---|---|---|---|---|
| 5-Cy-Ph-Ph1-F |  |  |  | 14 |
| 5-Cy-Ph-Ph1-OCFFF |  | 11 |  |  |
| 3-Ph-Ph-Ph3-F | 10 | 10 |  |  |
| 3-Ph-Ph1-Ph3-F | 10 | 10 |  |  |
| 3-Ph-Ph3-Ph1-F | 6 | 10 |  |  |
| 3-Cy-Cy-4 | 6 | 5 |  |  |
| 3-Cy-Cy-5 |  | 5 |  |  |
| 3-Cy-Ph1-Ph-Cy-3 |  |  | 6 |  |
| Sum of composition ratios | 100 | 100 | 100 | 100 |
| Tni/° C. | 91.6 | 85.7 | 78.4 | 65.6 |
| $\Delta n$ (20° C.) | 0.1100 | 0.113 | 0.101 | 0.1168 |
| $\Delta \epsilon$ (20° C.) | 11.6 | 10.3 | 10.2 | 10.5 |
| K3/K1 (20° C.) | 1.39 | 1.39 | 1.36 | 1.43 |
| K3/pN (20° C.) | 15.7 | 16.1 | 15.2 | 16.5 |
| K1/pN (20° C.) | 11.3 | 11.6 | 11.2 | 11.5 |
| Vsat/V (25° C.) | 8.7 | 9.5 | 9.8 | 10.5 |
| $\tau r + d$/msec (25° C.) | 1.23 | 1.17 | 1.06 | 1.10 |

Examples 46 to 48

The liquid crystals having positive dielectric anisotropy indicated in Table 16 were interposed between a first substrate and a second substrate in the same manner as in Example 42, and thus liquid crystal panels were produced.

The liquid crystal panels in which the liquid crystals having positive dielectric anisotropy disclosed in Examples 46 to 48 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

TABLE 16

|  | Example 46 | Example 47 | Example 48 |
|---|---|---|---|
| 5-Cy-Ph-F | 5 | 5 |  |
| 5-Ph-Ph1-F |  |  | 5 |
| 7-Cy-Ph-F | 6 | 6 |  |
| 7-Ph1-Ph-OCFFF |  |  | 6 |
| 2-Cy-Cy-Ph-OCFFF | 11 | 11 | 11 |
| 3-Cy-Cy-Ph1-F | 12 |  |  |
| 3-Cy-Cy-Ph3-OCFFF |  | 12 |  |
| 3-Cy-Cy-Ph-OCFFF | 12 | 12 | 10 |
| 3-Cy-Ph-Ph1-F |  |  | 14 |
| 4-Cy-Cy-Ph-OCFFF | 10 | 10 | 10 |
| 5-Cy-Cy-Ph1-OCFFF |  |  | 9 |
| 5-Cy-Cy-Ph-OCFFF | 12 | 12 | 6 |
| 5-Cy-Ph-Ph1-F |  |  | 11 |
| 5-Cy-Ph-Ph1-OCFFF | 11 | 11 |  |
| 3-Ph-Ph-Ph3-F | 11 | 11 | 6 |
| 3-Ph-Ph1-Ph3-F | 10 |  | 5 |
| 5-Ph-Ph1-Ph3-F |  | 10 |  |
| 5-Ph-Ph3-Ph1-F |  |  | 5 |
| 5-Cy-Ph1-Ph-Cy-3 |  |  | 2 |
| Sum of composition ratios | 100 | 100 | 100 |
| Tni/° C. | 92.8 | 98.9 | 96.4 |
| $\Delta n$ (20° C.) | 0.1193 | 0.1204 | 0.1086 |
| $\Delta \epsilon$ (20° C.) | 12.6 | 13.1 | 10.1 |
| K3/K1 (20°) | 1.52 | 1.56 | 1.40 |
| K3/pN (20° C.) | 17.3 | 17.6 | 15.8 |
| K1/pN (20° C.) | 11.4 | 11.3 | 11.3 |
| Vsat/V (25° C.) | 6.7 | 6.1 | 9.9 |
| $\tau r + d$/msec (25° C.) | 1.14 | 1.03 | 1.07 |

Examples 49 to 51

The liquid crystals having positive dielectric anisotropy indicated in Table 17 were interposed between a first substrate and a second substrate in the same manner as in Example 42, and thus liquid crystal panels were produced.

The liquid crystal panels in which the liquid crystals having positive dielectric anisotropy disclosed in Examples 49 to 51 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

TABLE 17

|  | Example 49 | Example 50 | Example 51 |
|---|---|---|---|
| 5-Ph1-Ph-OCFFF |  |  | 5 |
| 5-Ph-Ph1-F |  | 5 | 10 |
| 5-Ph-Ph-OCFFF | 5 |  |  |
| 7-Cy-2-Ph1-F |  |  | 5 |
| 7-Ph1-Ph-OCFFF |  | 6 | 15 |
| 7-Ph-Ph-OCFFF | 6 |  |  |
| 3-Cy-Cy-Ph1-F | 12 | 10 |  |
| 3-Cy-Cy-Ph1-OCFFF | 12 | 12 |  |
| 3-Cy-Cy-Ph-OCFFF |  |  | 12 |
| 3-Cy-Ph1-Ph-OCFF |  |  | 7 |
| 3-Cy-Ph-Ph1-F |  |  | 13 |
| 3-Cy-Ph-Ph1-OCFF |  |  | 8 |
| 3-Cy-Ph-Ph1-OCFFF | 12 | 12 |  |
| 5-Cy-Cy-Ph1-F | 11 | 11 |  |
| 5-Cy-Cy-Ph1-OCFFF | 9 | 9 |  |
| 5-Cy-Ph-Ph1-OCFFF | 11 | 11 |  |
| 3-Ph-Ph-Ph3-F |  |  | 9 |
| 3-Ph-Ph1-Ph3-F | 12 | 12 |  |
| 3-Ph-Ph3-Ph1-F |  |  | 12 |
| 5-Ph-Ph3-Ph1-F | 10 | 12 |  |
| 3-Cy-Cy-Ph1-Ph-F |  |  | 4 |
| Sum of composition ratios | 100 | 100 | 100 |
| Tni/° C. | 91.1 | 83.5 | 61.3 |
| $\Delta n$ (20°) | 0.1118 | 0.1102 | 0.1325 |
| $\Delta \epsilon$ (20° C.) | 11.7 | 10.9 | 15.7 |
| K3/K1 (20°) | 1.37 | 1.38 | 1.38 |
| K3/pN (20° C.) | 14.9 | 14.9 | 15.3 |
| K1/pN (20° C.) | 10.9 | 10.8 | 11.1 |
| Vsat/V (25° C.) | 8.4 | 9.3 | 5.4 |
| $\tau r + d$/msec (25° C.) | 1.13 | 1.12 | 0.95 |

Example 52

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. The liquid crystals having positive dielectric anisotropy disclosed in Examples 42 to 51 and Comparative Examples 1 to 3 were respectively interposed between the first substrate and the second substrate, and thus liquid crystal panels were produced ($d_{ITO}$=4 μm, $d_{gap}$=4 μm, alignment film: SE-5300, AL-1051).

The liquid crystal panels in which the liquid crystals having positive dielectric anisotropy disclosed in Examples 42 to 51 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Examples 1 to 3 were interposed.

Example 53

An electrode structure such as illustrated in FIG. 4 was produced on a second substrate, and a first substrate having no electrode structure provided thereon was used. An alignment film of vertical orientation was formed on each of the respective surfaces that faced each other. Compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 42 to 51 and Comparative Examples 1 to 3 were interposed between the first substrate and the second substrate, and thus liquid crystal panels were produced ($d_{ITO}$=4 μm, $d_{gap}$=4 μm, alignment film: SE-5300). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 42 to 51 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Examples 1 to 3 were interposed.

Example 54

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. Each of the compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 42 to 51 and Comparative Examples 1 to 3 was interposed between the first substrate and the second substrate, and thus liquid crystal panels were produced ($d_{ITO}$=4 μm, $d_{gap}$=4 μm, alignment film: SE-5300, AL-1051). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 42 to 51 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Examples 1 to 3 were interposed.

Examples 55 to 57

An electrode structure such as illustrated in FIG. 4 was produced on a second substrate, and a first substrate having no electrode structure provided thereon was used. An alignment film of vertical orientation was formed on each of the respective surfaces that faced each other. The liquid crystals having positive dielectric anisotropy indicated in Table 18 were interposed between the first substrate and the second substrate, and thus liquid crystal panels were produced ($d_{ITO}$=4 μm, $d_{gap}$=4 μm, alignment film: SE-5300).

TABLE 18

| | Example 55 | Example 56 | Example 57 |
|---|---|---|---|
| 3-Ph-T-Ph1-F | | 5 | |
| 5-Cy-Ph-F | 5 | | |
| 7-Cy-Ph3-F | | 9 | |
| 7-Cy-Ph-F | 6 | | |
| 2-Cy-Cy-Ph1-OCFFF | | | 8 |
| 3-Cy-Cy-2-Ph3-F | | | 7 |
| 3-Cy-Cy-Ph1-F | | 9 | |
| 3-Cy-Cy-Ph3-F | 16 | 11 | 12 |
| 3-Cy-Cy-Ph3-OCFFF | | | 12 |
| 3-Cy-Cy-Ph-OCFFF | 10 | | |
| 3-Cy-Ph-T-Ph3-F | | | 10 |
| 3-Cy-Ph-T-Ph1-OCFFF | 15 | 9 | 5 |
| 4-Cy-Cy-Ph3-F | 11 | 12 | |
| 4-Cy-Cy-Ph-OCFFF | 10 | | |
| 4-Cy-Ph-Ph3-F | | | 12 |
| 5-Cy-Cy-Ph1-F | | 10 | |
| 5-Cy-Cy-Ph1-OCFFF | | 9 | |
| 5-Cy-Cy-Ph3-F | 12 | 5 | 9 |
| 5-Cy-Cy-Ph-OCFFF | 10 | | 14 |
| 5-Cy-Ph-Ph1-OCFFF | | 11 | |
| 3-Cy-Cy-4 | | 5 | |
| 3-Cy-Cy-5 | 5 | 5 | 5 |
| 3-Cy-Ph1-Ph-Cy-3 | | | 6 |
| Sum of composition ratios | 100 | 100 | 100 |
| Tni/° C. | 92.3 | 86.4 | 80.3 |
| Δn (20°) | 0.1076 | 0.112 | 0.108 |
| Δε (20° C.) | 11.7 | 10.9 | 11.2 |
| K3/K1 (20°) | 1.32 | 1.39 | 1.35 |
| K3/pN (20° C.) | 14.8 | 15.1 | 14.6 |
| K1/pN (20° C.) | 11.2 | 10.9 | 10.8 |
| Vth/V (25° C.) | 4.3 | 5.1 | 4.9 |
| τr + d/msec (25° C.) | 1.28 | 0.95 | 1.38 |

The liquid crystal panels in which the liquid crystals having positive dielectric anisotropy disclosed in Examples 55 to 57 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Comparative Example 4

A liquid crystal panel of Comparative Example 4 was produced in the same manner as in Example 55 by interposing the liquid crystals having positive dielectric anisotropy indicated in Table 19, and the property values were measured. The results are presented in Table 19.

TABLE 19

| | Comparative Example 4 |
|---|---|
| 5-Cy-Ph-F | 5 |
| 7-Cy-Ph-F | 6 |
| 2-Cy-Cy-Ph-OCFFF | 11 |
| 3-Cy-Cy-Ph1-OCFFF | 12 |
| 3-Cy-Cy-Ph-OCFFF | 12 |
| 4-Cy-Cy-Ph-OCFFF | 10 |
| 5-Cy-Cy-Ph3-F | 9 |
| 5-Cy-Cy-Ph-OCFFF | 12 |
| 3-Ph-VO-Ph1-CN | 11 |

TABLE 19-continued

|  | Comparative Example 4 |
| --- | --- |
| 3-Cy-Cy-Ph3-CN | 8 |
| 3-Cy-Oc-Ph3-F | 4 |
| Sum of composition ratios | 100 |
| Tni/° C. | 92.1 |
| Δn (20°) | 0.094 |
| Δε (20° C.) | 11.7 |
| Vsat/V (25° C.) | 5.6 |
| τr + d/msec (25° C., 6 V) | 3.7 |

The liquid crystal panel of Comparative Example 4 in which liquid crystals having positive dielectric anisotropy were interposed, exhibited a slow response speed, a slightly smaller amount of light transmission, and particularly poor retention ratio and long-term reliability as compared with the liquid crystal panels of the invention.

Examples 58 and 59

The liquid crystals having positive dielectric anisotropy indicated in Table 20 were interposed between a first substrate and a second substrate in the same manner as in Example 55 and Comparative Example 4, and thus liquid crystal panels were produced.

TABLE 20

|  | Example 58 | Example 59 |
| --- | --- | --- |
| 3-Ph-T-Ph1-F |  | 5 |
| 7-Cy-Ph-F |  | 6 |
| 2-Cy-Cy-Ph-OCFFF | 15 | 11 |
| 3-Cy-Cy-Ph1-F |  | 12 |
| 3-Cy-Cy-Ph3-F |  | 10 |
| 3-Cy-Cy-Ph3-OCFFF |  | 11 |
| 3-Cy-Cy-Ph-OCFFF | 18 | 12 |
| 3-Cy-Ph-T-Ph3-F | 10 | 11 |
| 3-Cy-Ph-T-Ph1-OCFFF | 8 |  |
| 4-Cy-Cy-Ph-OCFFF | 12 | 10 |
| 5-Cy-Cy-Ph3-OCFFF | 14 |  |
| 5-Cy-Cy-Ph-OCFFF | 12 | 12 |
| 3-Cy-Cy-4 | 6 |  |
| 3-Cy-Cy-5 | 5 |  |
| Sum of composition ratios | 100 | 100 |
| Tni/° C. | 65.3 | 93.1 |
| Δn (20° C.) | 0.1187 | 0.1213 |
| Δε (20° C.) | 11.6 | 12.8 |
| K3/K1 (20° C.) | 1.29 | 13.31 |
| K3/pN (20° C.) | 13.7 | 14.3 |
| K1/pN (20° C.) | 10.6 | 10.9 |
| Vth/V (25° C.) | 6.4 | 4.4 |
| τr + d/msec (25° C.) | 1.42 | 1.22 |

The liquid crystal panels in which the liquid crystals having positive dielectric anisotropy disclosed in Examples 58 and 59 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Example 60

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. The liquid crystals having positive dielectric anisotropy disclosed in Examples 55 to 59 and Comparative Example 4 were respectively interposed between the first substrate and the second substrate, and thus liquid crystal panels were produced ($d_{ITO}$=4 μm, $d_{gap}$=4 μm, alignment film: SE-5300, AL-1051).

The liquid crystal panels in which the liquid crystals having positive dielectric anisotropy disclosed in Examples 55 to 59 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 4 were interposed.

Example 61

An electrode structure such as illustrated in FIG. 4 was produced on a second substrate, and a first substrate having no electrode structure provided thereon was used. An alignment film of vertical orientation was formed on each of the respective surfaces that faced each other. Compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 55 to 59 and Comparative Example 4 were interposed between the first substrate and the second substrate, and thus liquid crystal panels were produced ($d_{ITO}$=4 μm, $d_{gap}$=4 μm, alignment film: SE-5300). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 55 to 59 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 4 were interposed.

Example 62

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. Each of the compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 55 to 59 and Comparative Example 4 was interposed between the first substrate and the second substrate, and thus liquid crystal panels were produced ($d_{ITO}$=4 μm, $d_{gap}$=4 μm, alignment film: SE-5300, AL-1051). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 55 to 59 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 4 were interposed.

Examples 63 to 65

An electrode structure such as illustrated in FIG. 4 was produced on a second substrate, and a first substrate having no electrode structure provided thereon was used. An alignment film of vertical orientation was formed on each of the respective surfaces that faced each other. The liquid crystals having positive dielectric anisotropy indicated in Table 21 were interposed between the first substrate and the second substrate, and thus liquid crystal panels were produced ($d_{ITO}$=4 μm, $d_{gap}$=4 μm, alignment film: SE-5300).

TABLE 21

|  | Example 63 | Example 64 | Example 65 |
|---|---|---|---|
| 7-Cy-Ph3-F |  | 10 |  |
| 2-Cy-Cy-Ph1-OCFF |  |  | 8 |
| 3-Cy-Cy-2-Ph3-F |  |  | 7 |
| 3-Cy-Cy-Ph3-F | 11 | 12 | 12 |
| 3-Cy-Cy-Ph3-OCFFF |  |  | 12 |
| 3-Cy-Ph-Ph1-OCFFF | 10 |  |  |
| 3-Cy-Ph-Ph3-F | 15 | 10 | 15 |
| 4-Cy-Cy-Ph3-F |  | 13 |  |
| 4-Cy-Cy-Ph-OCFFF | 5 |  |  |
| 4-Cy-Ph-Ph3-F | 10 |  | 12 |
| 5-Cy-Cy-Ph1-OCFFF |  | 9 |  |
| 5-Cy-Cy-Ph3-F | 12 | 10 | 9 |
| 5-Cy-Cy-Ph-OCFFF | 10 |  | 4 |
| 5-Cy-Ph-Ph1-OCFFF |  | 11 |  |
| 5-Cy-Ph-Ph3-F | 11 | 5 | 10 |
| 0d1-Cy-Cy-5 | 11 |  |  |
| 0d3-Cy-Cy-3 |  | 10 |  |
| 1d1-Cy-Cy-5 |  |  | 5 |
| 0d1-Cy-Cy-Ph-1 | 5 | 10 |  |
| 0d3-Cy-Cy-Ph-1 |  |  | 6 |
| Sum of composition ratios | 100 | 100 | 100 |
| Tni/° C. | 90.8 | 85.3 | 80.6 |
| Δn (20° C.) | 0.1063 | 0.1097 | 0.1014 |
| Δε (20° C.) | 11.2 | 10.6 | 10.0 |
| K3/K1 (20° C.) | 1.34 | 1.36 | 1.40 |
| K3/pN (20° C.) | 15.1 | 14.8 | 14.7 |
| K1/pN (20° C.) | 11.3 | 10.9 | 10.5 |
| Vth/V (25° C.) | 4.7 | 5.1 | 5.4 |
| τr + d/msec (25° C.) | 1.23 | 1.18 | 1.15 |

The liquid crystal panels in which the liquid crystals having positive dielectric anisotropy disclosed in Examples 63 to 65 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Comparative Example 5

A liquid crystal panel of Comparative Example 5 was produced in the same manner as in Example 63 by interposing the liquid crystals having positive dielectric anisotropy indicated in Table 22, and the property values were measured. The results are presented in Table 22.

TABLE 22

|  | Comparative Example 5 |
|---|---|
| 5-Cy-Ph-F | 5 |
| 7-Cy-Ph-F | 6 |
| 2-Cy-Cy-Ph-OCFFF | 11 |
| 3-Cy-Cy-Ph1-OCFFF | 12 |
| 3-Cy-Cy-Ph-OCFFF | 12 |
| 4-Cy-Cy-Ph-OCFFF | 10 |
| 5-Cy-Cy-Ph3-F | 9 |
| 5-Cy-Cy-Ph-OCFFF | 12 |
| 3-Ph-VO-Ph1-CN | 11 |
| 3-Cy-Cy-Ph3-CN | 8 |
| 3-Cy-Oc-Ph3-F | 4 |
| Sum of composition ratios | 100 |
| Tni/° C. | 92.1 |
| Δn (20°) | 0.094 |
| Δε (20° C.) | 11.7 |
| Vsat/V (25° C.) | 5.6 |
| τr + d/msec (25° C., 6 V) | 3.7 |

The liquid crystal panel of Comparative Example 5 in which liquid crystals having positive dielectric anisotropy were interposed, exhibited a slow response speed, a slightly smaller amount of light transmission, and particularly poor retention ratio and long-term reliability as compared with the liquid crystal panels of the invention.

Examples 66 and 67

The liquid crystals having positive dielectric anisotropy indicated in Table 23 were interposed between a first substrate and a second substrate in the same manner as in Example 63 and Comparative Example 5, and thus liquid crystal panels were produced.

TABLE 23

|  | Example 66 | Example 67 |
|---|---|---|
| 5-Cy-Ph-F |  | 5 |
| 7-Cy-Ph-F |  | 6 |
| 2-Cy-Cy-Ph-OCFFF | 15 | 11 |
| 3-Cy-Cy-Ph1-F |  | 12 |
| 3-Cy-Cy-Ph-OCFFF | 18 | 12 |
| 3-Cy-Ph-Ph1-F | 18 |  |
| 4-Cy-Cy-Ph-OCFFF | 10 |  |
| 5-Cy-Cy-Ph3-OCFFF | 10 | 12 |
| 5-Cy-Ph-Ph1-F | 14 |  |
| 5-Cy-Ph-Ph1-OCFFF |  | 11 |
| 3-Ph-Ph-Ph3-F |  | 11 |
| 3-Ph-Ph1-Ph3-F |  | 10 |
| 0d1-Cy-Cy-5 | 11 |  |
| 0d1-Cy-Cy-Ph-1 |  | 7 |
| 0d1-Cy-Cy-Ph-Ph-1 | 4 |  |
| 0d3-Cy-Cy-Ph-Ph-1 |  | 3 |
| Sum of composition ratios | 100 | 100 |
| Tni/° C. | 68.2 | 93.1 |
| Δn (20° C.) | 0.1154 | 0.1195 |
| Δε (20° C.) | 10.1 | 12.7 |
| K3/K1 (20° C.) | 1.35 | 1.41 |
| K3/pN (20° C.) | 15.4 | 15.8 |
| K1/pN (20° C.) | 11.4 | 11.2 |
| Vth/V (25° C.) | 6.4 | 4.1 |
| τr + d/msec (25° C.) | 0.93 | 1.12 |

The liquid crystal panels in which the liquid crystals having positive dielectric anisotropy disclosed in Examples 66 and 67 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Example 68

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. The liquid crystals having positive dielectric anisotropy disclosed in Examples 63 to 67 and Comparative Example 5 were respectively interposed between the first substrate and the second substrate, and thus liquid crystal panels were produced ($d_{ITO}$=4 μm, $d_{gap}$=4 μm, alignment film: SE-5300, AL-1051).

The liquid crystal panels in which the liquid crystals having positive dielectric anisotropy disclosed in Examples 63 to 67 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 5 were interposed.

Example 69

An electrode structure such as illustrated in FIG. 4 was produced on a second substrate, and a first substrate having no electrode structure provided thereon was used. An alignment film of vertical orientation was formed on each of the respective surfaces that faced each other. Compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 63 to 67 and Comparative Example 5 were interposed between the first substrate and the second substrate, and thus liquid crystal panels were produced ($d_{ITO}$=4 μm, $d_{gap}$=4 μm, alignment film: SE-5300). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 63 to 67 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 5 were interposed.

Example 70

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. Each of the compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 63 to 67 and Comparative Example 5 was interposed between the first substrate and the second substrate, and thus liquid crystal panels were produced ($d_{ITO}$=4 μm, $d_{gap}$=4 μm, alignment film: SE-5300, AL-1051). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 63 to 67 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 5 were interposed.

Examples 71 to 73

An electrode structure such as illustrated in FIG. 4 was produced on a second substrate, and a first substrate having no electrode structure provided thereon was used. An alignment film of vertical orientation was formed on each of the respective surfaces that faced each other. The liquid crystals having positive dielectric anisotropy indicated in Table 24 were interposed between the first substrate and the second substrate, and thus liquid crystal panels were produced ($d_{ITO}$=4 μm, $d_{gap}$=4 μm, alignment film: SE-5300).

TABLE 24

| | Example 71 | Example 72 | Example 73 |
|---|---|---|---|
| 7-Cy-Ph3-F | | 5 | |
| 2-Cy-Cy-Ph1-OCFF | | | 8 |
| 3-Cy-2-Cy-Ph3-F | | 5 | |
| 3-Cy-Cy-2-Ph3-F | | | 7 |
| 3-Cy-Cy-Ph3-F | 13 | 12 | 12 |
| 3-Cy-Cy-Ph3-OCFF | 13 | 5 | 12 |
| 3-Cy-Ph-Ph3-F | 10 | | 12 |
| 4-Cy-Cy-Ph3-F | 11 | 13 | 7 |
| 4-Cy-Cy-Ph-OCFFF | 5 | | |
| 4-Cy-Ph-Ph3-F | 10 | | 8 |
| 5-Cy-Cy-2-Ph3-F | | 5 | |
| 5-Cy-Cy-Ph1-F | | 11 | |
| 5-Cy-Cy-Ph1-OCFFF | | 9 | 10 |
| 5-Cy-Cy-Ph3-F | 12 | 10 | 9 |
| 5-Cy-Cy-Ph-OCFFF | 10 | | 4 |
| 5-Cy-Ph-Ph3-F | | 5 | |
| 1-Ph-T-Ph-6 | | 5 | |
| 2-Ph-T-Ph-1 | 6 | | |
| 2-Ph-T-Ph-O1 | | | 5 |
| 3-Ph-T-Ph-O1 | 5 | | |
| 4-Ph-T-Ph-O1 | | 3 | |
| 5-Ph-T-Ph-O1 | | 5 | |
| 3-Cy-Ph1-T-Ph-2 | 5 | 7 | 6 |
| Sum of composition ratios | 100 | 100 | 100 |
| Tni/° C. | 91.1 | 84.6 | 80.2 |
| Δn (20°) | 0.1086 | 0.1103 | 0.1027 |
| Δε (20° C.) | 10.8 | 10.2 | 10.5 |
| K3/K1 (20°) | 1.37 | 1.39 | 1.40 |
| K3/pN (20° C.) | 15.3 | 14.9 | 15.1 |
| K1/pN (20° C.) | 11.2 | 10.7 | 10.8 |
| Vth/V (25° C.) | 4.8 | 5.2 | 4.6 |
| τr + d/msec (25° C.) | 1.37 | 1.29 | 1.18 |

The liquid crystal panels in which the liquid crystals having positive dielectric anisotropy disclosed in Examples 71 to 73 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Comparative Example 6

A liquid crystal panel of Comparative Example 6 was produced in the same manner as in Example 71 by interposing the liquid crystals having positive dielectric anisotropy indicated in Table 25, and the property values were measured. The results are presented in Table 25.

TABLE 25

|  | Comparative Example 6 |
|---|---|
| 5-Cy-Ph-F | 5 |
| 7-Cy-Ph-F | 6 |
| 2-Cy-Cy-Ph-OCFFF | 11 |
| 3-Cy-Cy-Ph1-OCFFF | 12 |
| 3-Cy-Cy-Ph-OCFFF | 12 |
| 4-Cy-Cy-Ph-OCFFF | 10 |
| 5-Cy-Cy-Ph3-F | 9 |
| 5-Cy-Cy-Ph-OCFFF | 12 |
| 3-Ph-VO-Ph1-CN | 11 |
| 3-Cy-Cy-Ph3-CN | 8 |
| 3-Cy-Oc-Ph3-F | 4 |
| Sum of composition ratios | 100 |
| Tni/° C. | 92.1 |
| Δn (20°) | 0.094 |
| Δε (20° C.) | 11.7 |
| Vsat/V (25° C.) | 5.6 |
| τr + d/msec (25° C., 6 V) | 3.7 |

The liquid crystal panel of Comparative Example 6 in which liquid crystals having positive dielectric anisotropy were interposed, exhibited a slow response speed, a slightly smaller amount of light transmission, and particularly poor retention ratio and long-term reliability as compared with the liquid crystal panels of the invention.

Examples 74 and 75

The liquid crystals having positive dielectric anisotropy indicated in Table 26 were interposed between a first substrate and a second substrate in the same manner as in Example 71 and Comparative Example 6, and thus liquid crystal panels were produced.

TABLE 26

|  | Example 74 | Example 75 |
|---|---|---|
| 5-Cy-Ph-F |  | 6 |
| 7-Cy-Ph-F |  | 7 |
| 2-Cy-Cy-Ph1-F | 5 |  |
| 2-Cy-Cy-Ph-OCFFF | 12 | 9 |
| 3-Cy-Cy-Ph1-F | 15 | 12 |
| 3-Cy-Cy-Ph3-F |  | 10 |
| 3-Cy-Cy-Ph-OCFFF | 16 | 12 |
| 4-Cy-Cy-Ph1-F | 3 |  |
| 4-Cy-Cy-Ph-OCFFF | 11 |  |
| 5-Cy-Cy-Ph3-OCFFF | 12 | 12 |
| 5-Cy-Ph-Ph1-F | 10 |  |
| 5-Cy-Ph-Ph1-OCFFF |  | 10 |
| 3-Ph-Ph1-Ph3-F |  | 11 |
| 1-Ph-T-Ph-6 | 6 |  |
| 5-Ph-T-Ph-O1 | 5 |  |
| 3-Cy-Ph1-T-Ph-2 |  | 7 |
| 2Cy-Cy-Ph-Ph-1 | 5 |  |
| 4-Cy-Cy-Ph-Ph-1 |  | 4 |
| Sum of composition ratios | 100 | 100 |
| Tni/° C. | 70.3 | 92.9 |
| Δn (20° C.) | 0.1154 | 0.1203 |
| Δε (20° C.) | 11.4 | 12.4 |
| K3/K1 (20° C.) | 1.41 | 1.48 |
| K3/pN (20° C.) | 15.2 | 15.7 |
| K1/pN (20° C.) | 10.8 | 10.6 |
| Vth/V (25° C.) | 4.6 | 4.2 |
| τr + d/msec (25° C.) | 0.92 | 1.04 |

The liquid crystal panels in which the liquid crystals having positive dielectric anisotropy disclosed in Examples 74 and 75 were interposed, realized faster response speeds, larger amounts of light transmission, a reduction in light leakage caused by external pressure, wider viewing angles, and higher contrast ratios, as compared with liquid crystal panels in which conventional liquid crystals having positive dielectric anisotropy were interposed.

Example 76

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. The liquid crystals having positive dielectric anisotropy disclosed in Examples 71 to 75 and Comparative Example 6 were respectively interposed between the first substrate and the second substrate, and thus liquid crystal panels were produced ($d_{ITO}$=4 μm, $d_{gap}$=4 μm, alignment film: SE-5300, AL-1051).

The liquid crystal panels in which the liquid crystals having positive dielectric anisotropy disclosed in Examples 71 to 75 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 6 were interposed.

Example 77

An electrode structure such as illustrated in FIG. 4 was produced on a second substrate, and a first substrate having no electrode structure provided thereon was used. An alignment film of vertical orientation was formed on each of the respective surfaces that faced each other. Compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 71 to 75 and Comparative Example 6 were interposed between the first substrate and the second substrate, and thus liquid crystal panels were produced ($d_{ITO}$=4 μm, $d_{gap}$=4 μm, alignment film: SE-5300). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 71 to 75 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 6 were interposed.

Example 78

An electrode structure such as illustrated in FIG. 4 was produced on a second substrate, and a first substrate having no electrode structure provided thereon was used. An alignment film of vertical orientation was formed on each of the other sides of the respective surfaces that faced each other, and an alignment film of horizontal orientation was formed on each of the reverse sides. Each of the compositions obtained by adding 0.3% by mass of 2-methyl-acrylic acid 4'-{2-[4-(2-acryloyloxyethyl)phenoxycarbonyl]ethyl}biphenyl-4-yl ester to the liquid crystals having positive dielectric anisotropy as indicated in Examples 71 to 75 and Comparative Example 6 was interposed between the first substrate and the second substrate, and thus liquid crystal panels were produced ($d_{ITO}$=4 μm, $d_{gap}$=4 μm, alignment film: SE-5300, AL-1051). While a driving voltage was applied between the electrodes, the liquid crystal panels were irradiated with ultraviolet radiation for 600 seconds (3.0 J/cm$^2$), and thus a polymerization treatment was carried out.

The liquid crystal panels in which the liquid crystals having positive dielectric anisotropy disclosed in Examples 71 to 75 were interposed, realized faster response speeds, larger amounts of light transmission, a reduction in light leakage caused by external pressure, wider viewing angles, and higher contrast ratios, as compared with liquid crystal panels in which liquid crystals having positive dielectric anisotropy disclosed in Comparative Example 6 were interposed.

What is claimed is:

1. A liquid crystal display device comprising:
a first substrate;
a second substrate; and
a liquid crystal composition layer having positive dielectric anisotropy that is interposed between the first substrate and the second substrate, the liquid crystal display device having a plurality of pixels, with each of the pixels being independently controllable and comprising a pair of a pixel electrode and a common electrode, wherein the pair of a pixel electrode and the common electrode are provided on the first substrate, or the second substrate or both the first substrate and the second substrate, the long axis of liquid crystal molecules of the liquid crystal composition layer is aligned substantially perpendicularly to the substrate surface or is in a hybrid alignment,
wherein a liquid crystal composition of the liquid crystal composition layer comprises one or more compounds selected from the group consisting of compounds represented by General Formula (LC1) to General Formula (LC5):

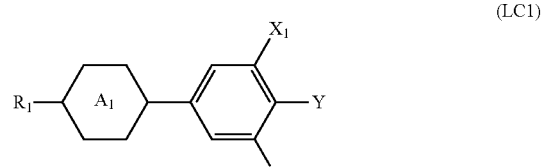
(LC1)

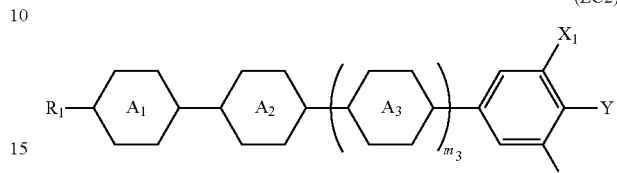
(LC2)

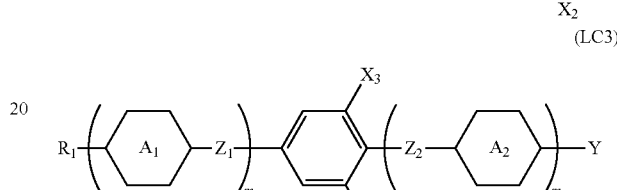
(LC3)

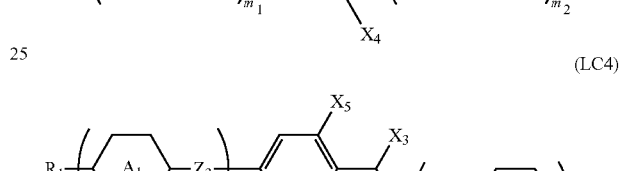
(LC4)

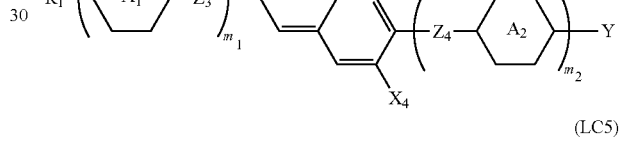
(LC5)

wherein $R_1$ represents an alkyl group having 1 to 15 carbon atoms; one or more $CH_2$ groups in the alkyl group may be substituted by —O—, —CH=CH—, —CO—, —OCO—, —COO—, —C≡C—, —CF$_2$O— or —OCF$_2$— such that O atoms are not directly adjacent to each other; one or two or more H atoms in the alkyl group may be optionally substituted by halogen; $A_1$, $A_2$ and $A_3$ each independently represent any one of the following structures:

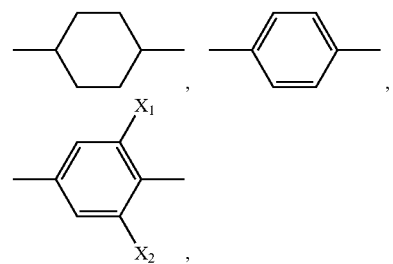

wherein $X_1$ and $X_2$ each independently represent H, Cl, F, CF$_3$ or OCF$_3$; one or more $CH_2$ groups in $A_1$ and $A_2$ may be substituted by —CH=CH—, —CF$_2$O— or —OCF$_2$—; one or more CH groups in $A_1$ and $A_2$ may be substituted by N atoms; one or more H atoms in $A_1$ and $A_2$ may be substituted by Cl, F, $CF_3$ or $OCF_3$; $X_1$ to $X_5$ each independently represent H, Cl, F, $CF_3$ or $OCF_3$; Y represents Cl, F, $CF_3$ or $OCF_3$; $Z_1$ to $Z_4$ each independently represent a single bond, —CH=CH—, —C≡C—, —$CH_2CH_2$—, —$(CH_2)_4$—, —$OCH_2$—, —$CH_2O$—, —$OCF_2$— or —$CF_2O$—; at least one of $Z_1$ and $Z_2$ that exist is not a single bond; $Z_5$ represents a $CH_2$ group or an O atom; $m_1$ and $m_2$ each independently represent an integer from 0 to 3; $m_1+m_2$ represents 1, 2 or 3; and $m_3$ each independently represent an integer from 0 to 2; and the transmittance of light that has penetrated through the liquid crystal composition layer is modulated at the electric field generated by the electrode structure described above wherein the liquid crystal composition does not include a compound having a cyano group.

2. The liquid crystal display device according to claim 1, wherein the liquid crystal composition further comprises one or more compounds represented by General Formula (LC6):

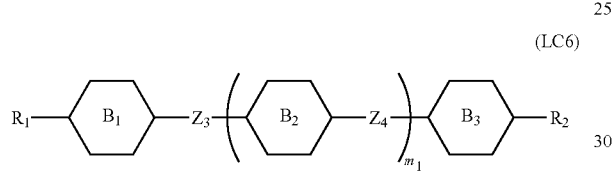

(LC6)

wherein $R_1$ and $R_2$ each independently represent an alkyl group having 1 to 15 carbon atoms; one or more $CH_2$ groups in the alkyl group may be substituted by —O—, —CH=CH—, —CO—, —COO—, —C≡C—, —$CF_2O$— or —$OCF_2$— such that O atoms are not directly adjacent to each other; one or more H atoms in the alkyl group may be optionally substituted by halogen; $Z_3$ and $Z_4$ each independently represent a single bond, —CH=CH—, —C≡C—, —$CH_2CH_2$—, —$(CH_2)_4$—, —$OCH_2$—, —$CH_2O$—, —$OCF_2$— or —$CF_2O$— such that O atoms are not directly adjacent to each other; one or more H atoms in the alkyl group may be optionally substituted by halogen; $Z_3$ and $Z_4$ each independently represent a single bond; ml represents an integer from 0 to 3; $B_1$ to $B_3$ each independently represent any one of the following structures:

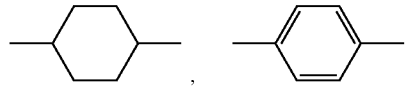

one or more $CH_2$ groups in $B_1$ to $B_3$ may be substituted by —CH=CH—, —$CF_2O$— or —$OCF_2$—; and one or more CH groups in $B_1$ to $B_3$ may be substituted by N atoms.

3. The liquid crystal display device according to claim 1 or 2, wherein the compound of General Formula (LC1) is one or more compounds selected from the group consisting of compounds represented by General Formula (LC1)-1 to General Formula (LC1)-4:

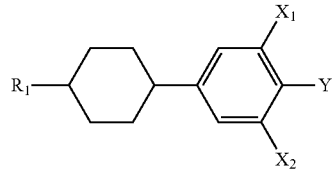

(LC1)-1

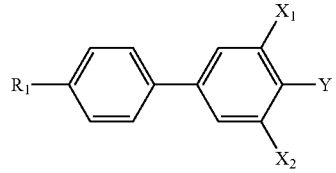

(LC1)-2

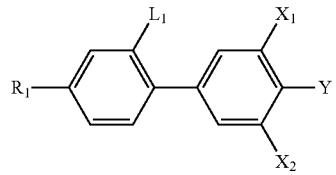

(LC1)-3

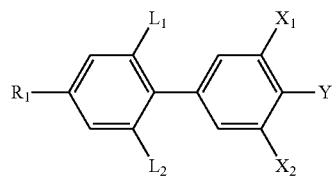

(LC1)-4 wherein $R_1$ represents an alkyl group having 1 to 15 carbon atoms; one or more $CH_2$ groups in the alkyl group may be substituted by —O—, —CH=CH—, —CO—, —OCO—, —COO—, —C≡C—, —$CF_2O$— or —$OCF_2$— such that O atoms are not directly adjacent to each other; Y represents Cl, F, $CF_3$ or $OCF_3$; and $X_1$, $X_2$, $L_1$ and $L_2$ each represent H, Cl, F, $CF_3$ or $OCF_3$.

4. The liquid crystal display device according to claim 1 or 2, wherein the compound of General Formula (LC2) is one or more compounds selected from the group consisting of compounds represented by General Formula (LC2)-1 to General Formula (LC2)-10:

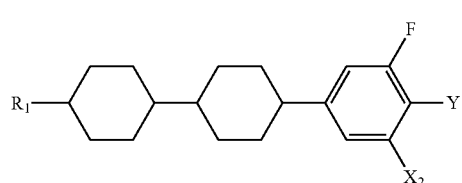

(LC2)-1

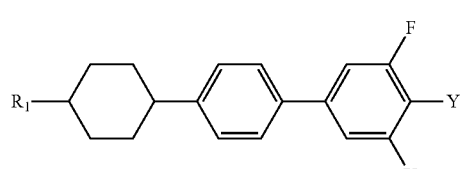

(LC2)-2

-continued

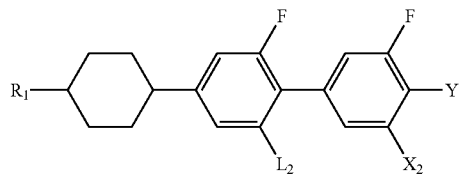
(LC2)-3

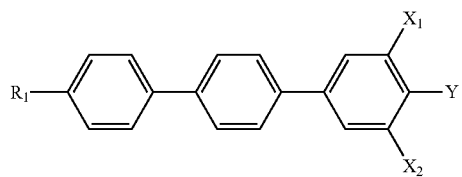
(LC2)-4

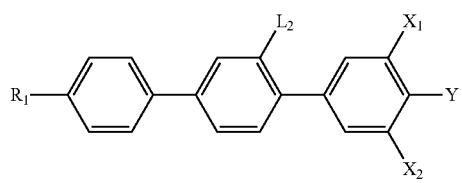
(LC2)-5

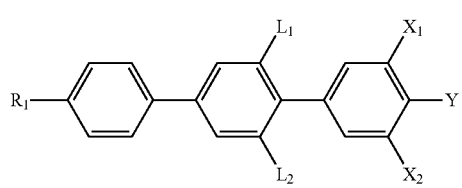
(LC2)-6

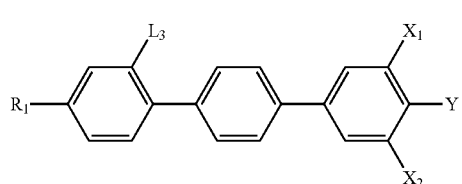
(LC2)-7

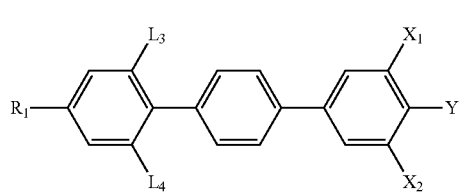
(LC2)-8

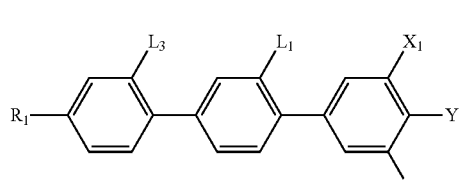
(LC2)-9

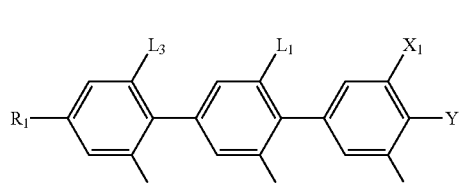
(LC2)-10 wherein $R_1$ represents an alkyl group having 1 to 15 carbon atoms; one or more $CH_2$ groups in the alkyl group may be substituted by —O—, —CH=CH—, —CO—, —OCO—, —COO—, —C≡C—, —CF$_2$O— or —OCF$_2$— such that O atoms are not directly adjacent to each other; $X_1$, $X_2$, $L_1$, $L_2$, $L_3$ and $L_4$ each represent H, Cl, F, $CF_3$ or $OCF_3$.

5. The liquid crystal display device according to claim 1 or 2, wherein the compound of General Formula (LC3) is one or more compounds selected from the group consisting of compounds represented by the following General Formula (LC3)-1 to General Formula (LC3)-28:

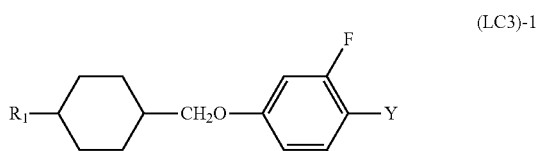
(LC3)-1

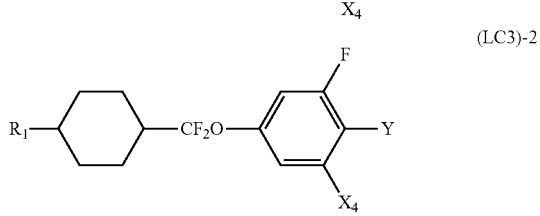
(LC3)-2

(LC3)-3
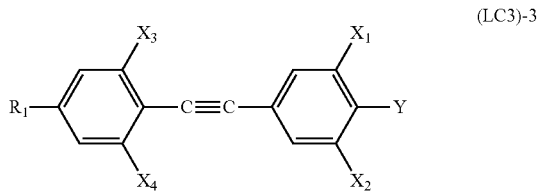

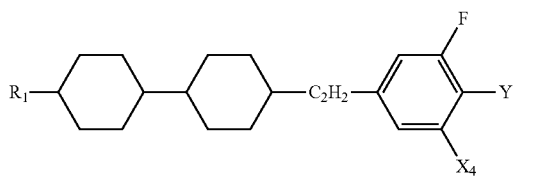
(LC3)-4

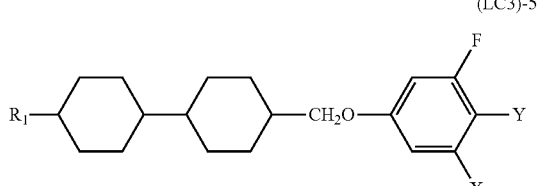
(LC3)-5

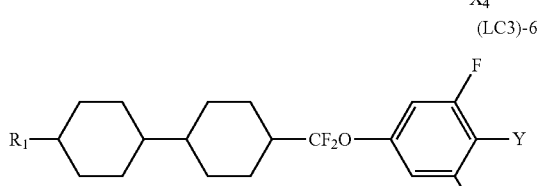
(LC3)-6

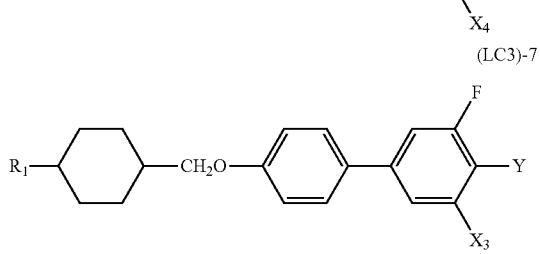
(LC3)-7

-continued
(LC3)-8
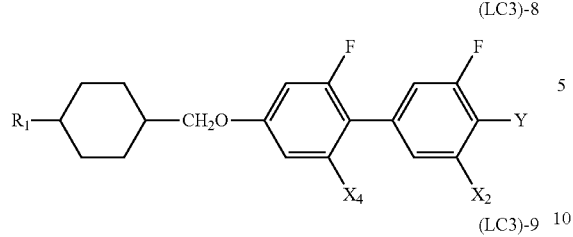
(LC3)-9
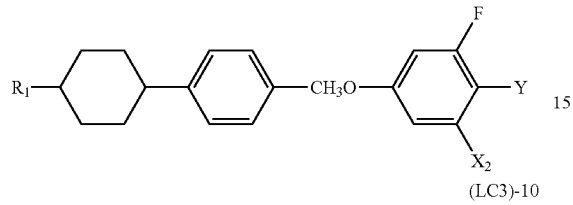
(LC3)-10
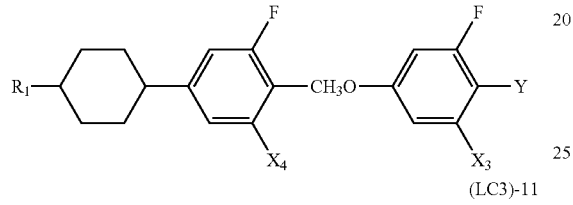
(LC3)-11
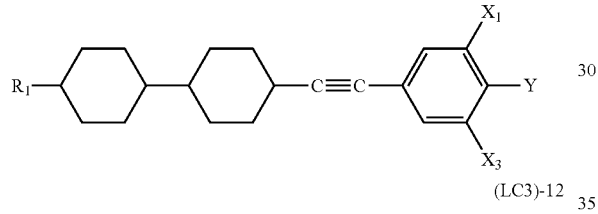
(LC3)-12
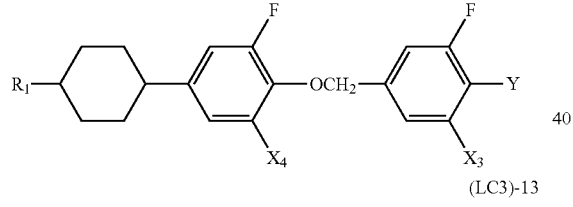
(LC3)-13
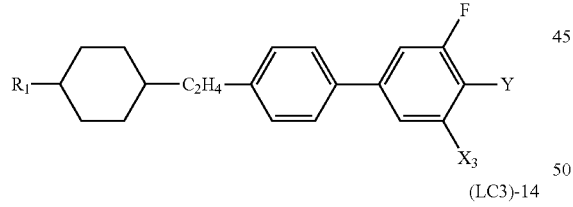
(LC3)-14
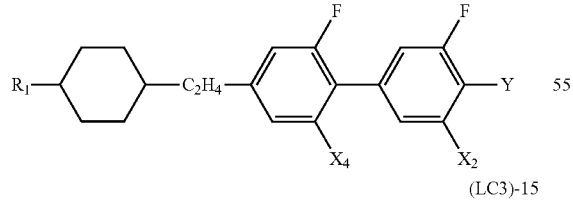
(LC3)-15
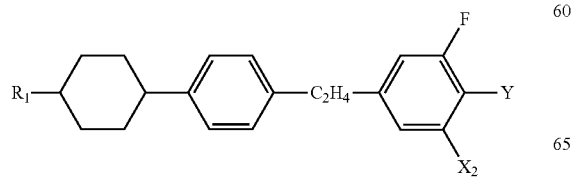
-continued
(LC3)-16
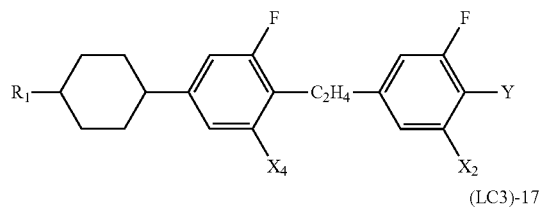
(LC3)-17
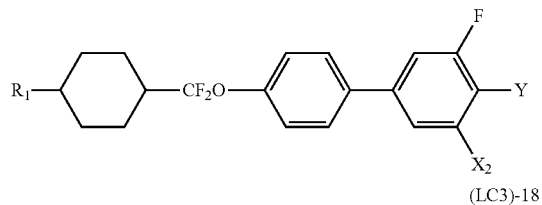
(LC3)-18
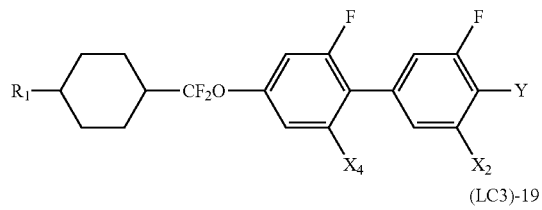
(LC3)-19
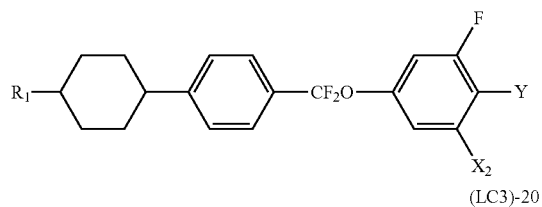
(LC3)-20
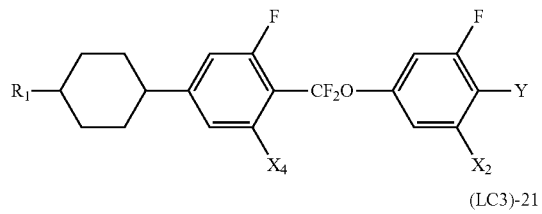
(LC3)-21
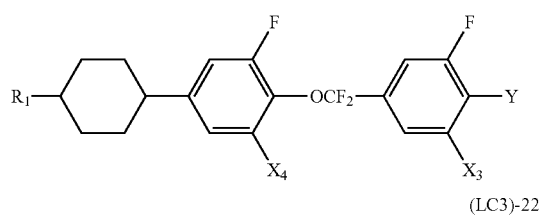
(LC3)-22
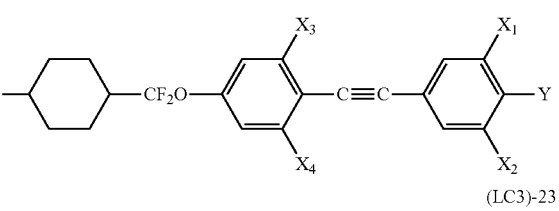
(LC3)-23
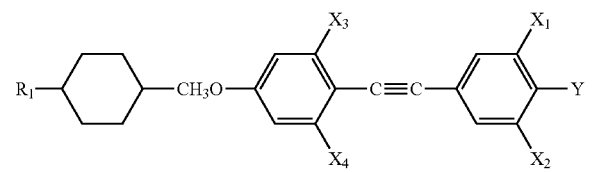

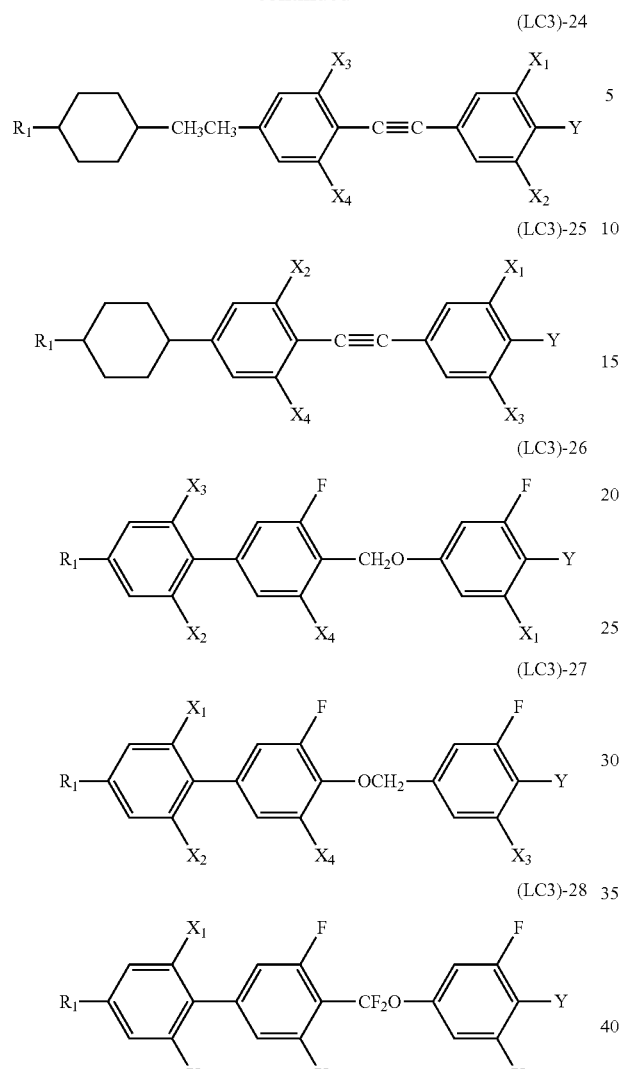

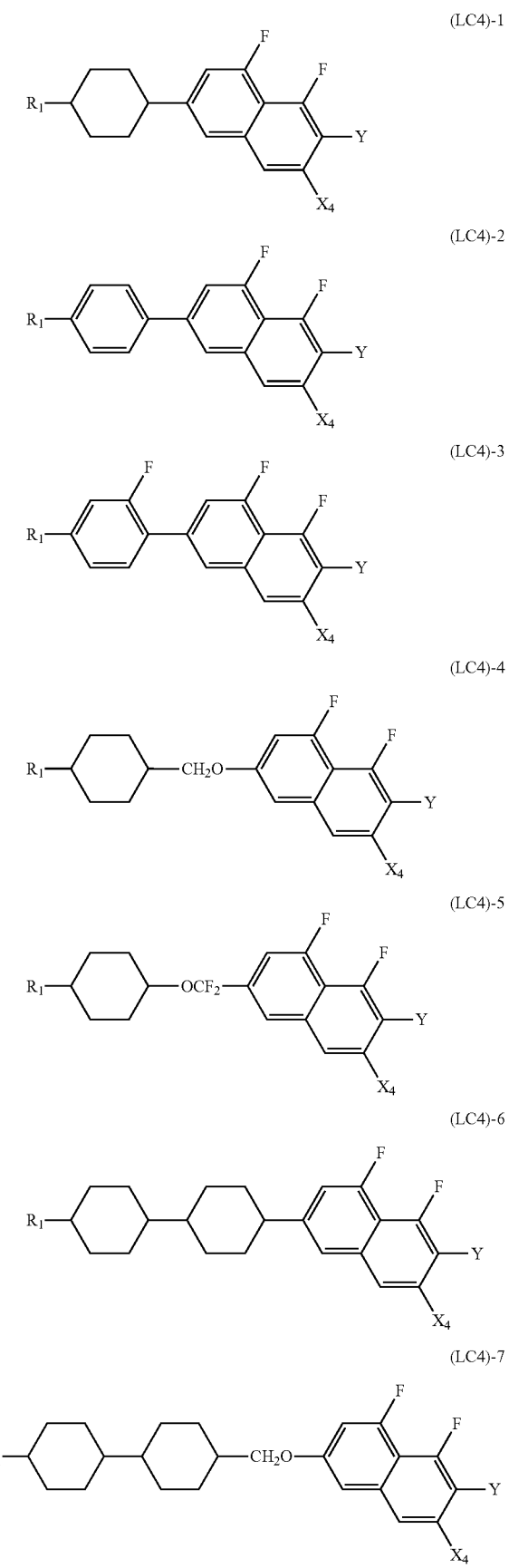

wherein R₁ represents an alkyl group having 1 to 15 carbon atoms; one or more $CH_2$ groups in the alkyl group may be substituted by —O—, —CH=CH—, —CO—, —OCO—, —COO—, —C≡C—, —CF₂O— or —OCF₂— such that O atoms are not directly adjacent to each other; one or more H atoms in the alkyl group may be optionally substituted by halogen; $X_2$ and $X_4$ each independently represent H, Cl, F, $CF_3$ or $OCF_3$; $Z_1$ represents a single bond, —CH=CH—, —C≡C—, —CH₂CH₂—, —(CH₂)₄—, —OCH₂—, —CH₂O—, —OCF₂— or —CF₂O—; and $m_1$ represents an integer from 0 to 3.

6. The liquid crystal display device according to claim 1 or 2, wherein the compound of General Formula (LC4) is one or more compounds selected from the group consisting of compounds represented by the following General Formula (LC4)-1 to General Formula (LC4)-8, and the compound of General Formula (LC5) is one or more compounds selected from the group consisting of compounds represented by the following General Formula (LC5)-1 to General Formula (LC5)-6:

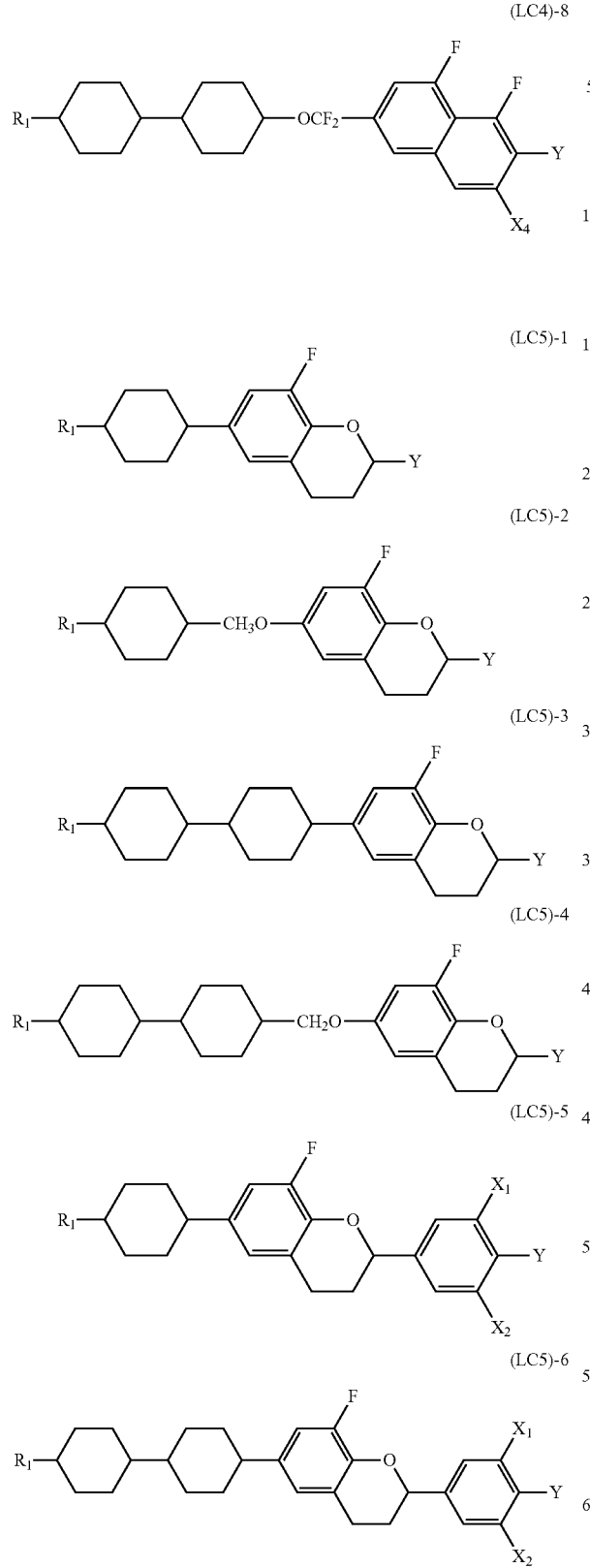

wherein $R_1$, $X_1$, $X_2$, $X_4$, $X_5$ and Y have the same meanings as $R_1$, $X_1$, $X_2$, $X_4$, $X_5$ and Y in General Formula (LC4) or General Formula (LC5), respectively.

7. The liquid crystal display device according to claim 2, wherein the compound of General Formula (LC6) is one or more compounds selected from the group consisting of compounds represented by the following General Formula (LC6)-1 to General Formula (LC6)-15:

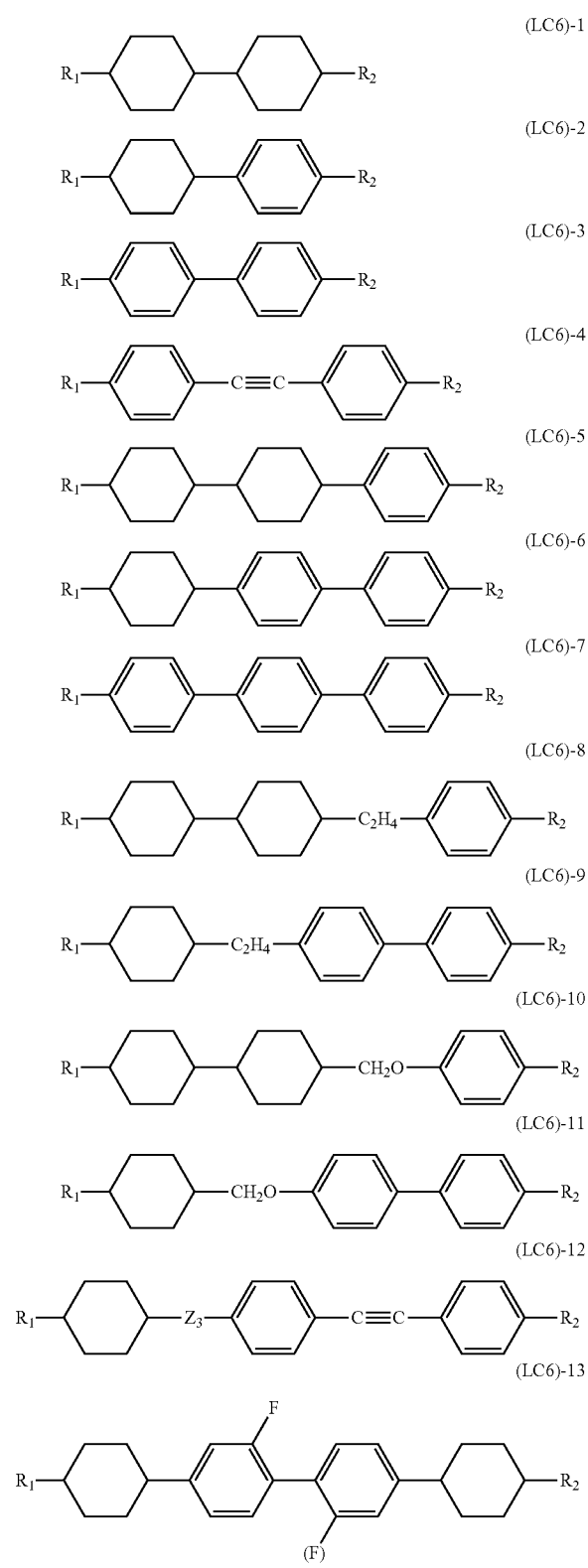

-continued

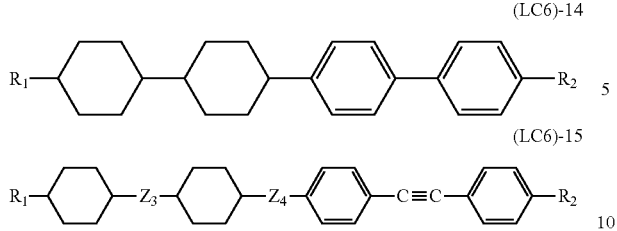

(LC6)-14

(LC6)-15 wherein R₁ and R₂ have the same meanings as R₁ and R₂ in General Formula (LC6).

8. The liquid crystal display device according to claim 1, wherein the liquid crystal composition comprises one or more polymerizable compounds.

9. A liquid crystal display device, wherein the polymerizable compound according to claim 8 is a disc-shaped liquid crystal compound having a structure in which a benzene derivative, a triphenylene derivative, a truxene derivative, a phthalocyanine derivative or a cyclohexane derivative serves as a parent nucleus at the center of the molecule, and a linear alkyl group, a linear alkoxy group or a substituted benzoyloxy group is radially substituted as a side chain.

10. The liquid crystal display device according to claim 8, wherein the liquid crystal composition does not substantially comprise an initiator.

11. The liquid crystal display device according to claim 8, wherein the liquid crystal composition comprises a polymerizable compound in an amount of 0.1% to 2.0% by mass is used.

12. The liquid crystal display device according to claim 1, wherein the liquid crystal composition further comprises one or more oxidation inhibitors.

13. The liquid crystal display device according to claim 1 wherein the liquid crystal composition further comprises one or more UV absorbers.

14. The liquid crystal display device according to claim 1, wherein a product (Δn·d) of a refractive index anisotropy (Δn) of the liquid crystal composition and a distance (d) between the first substrate and the second substrate of the liquid crystal display device is 0.33 to 0.40.

15. The liquid crystal display device according to claim 1, wherein a product (Δn·d) of a refractive index anisotropy (Δn) of the liquid crystal composition and a distance (d) between the first substrate and the second substrate of the display device is 0.34 to 0.44.

16. The liquid crystal display device according to claim 1, wherein an alignment film formed from a polyimide (PI), a chalcone, or a cinnamate is provided on each of the surfaces that are in contact with the liquid crystal composition on the first substrate and the second substrate of the display device.

17. The liquid crystal display device according to claim 1, wherein an alignment film produced by utilizing a photo-alignment technology is provided on each of the surfaces that are in contact with the liquid crystal composition on the first substrate and the second substrate of the liquid crystal display device.

18. The liquid crystal display device according to claim 1, wherein tilt angle between the substrate and the liquid crystal composition is 85° to 90°.

19. The liquid crystal display device according to claim 1, wherein a tilt angle between the first substrate or second substrate and the liquid crystal composition is 85° to 90°, and a tilt angle between the other substrate and the liquid crystal composition is 3° to 20°.

20. The liquid crystal display device according to claim 1, wherein the liquid crystal composition further comprises one or more compounds selected from compounds represented by General Formulas (LC1)-1, (LC2)-1, (LC3)-4, (LC3)-5, (LC3)-6, and (LC3)-11

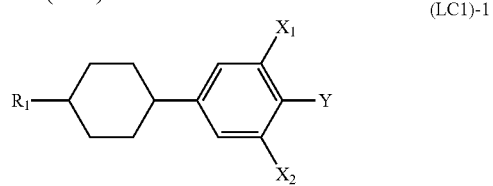

(LC1)-1

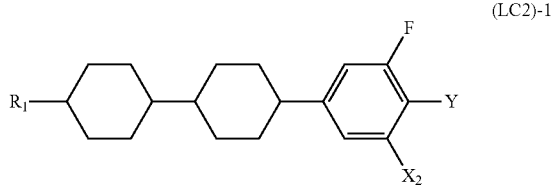

(LC2)-1

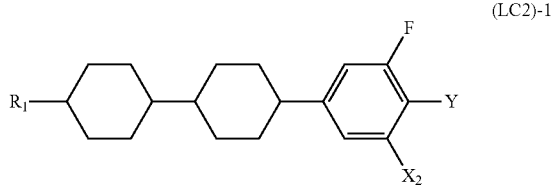

(LC3)-4

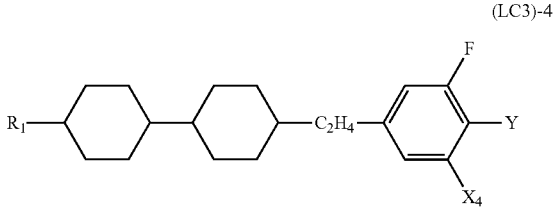

(LC3)-5

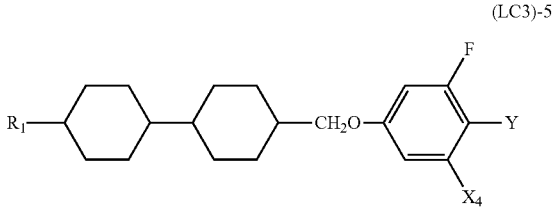

(LC3)-6

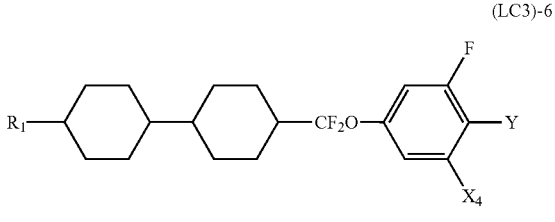

(LC3)-11

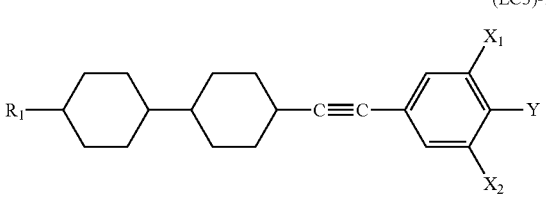

wherein R₁ represents an alkyl group having 1 to 15 carbon atoms; one or more CH₂ groups in the alkyl group may be substituted by —O—, —CH=CH—, —CO—, —OCO—, —COO—, —C≡C—, —CF₂O— or —OCF₂— such that O atoms are not directly adjacent to each other; one or more H atoms in the alkyl group may be optionally substituted by halogen; Y represents Cl, F, CF₃ or OCF₃; X₁ and X₂, each represent H, Cl, F, CF₃ or OCF₃.

21. The liquid crystal display device according to claim 1, wherein the liquid crystal composition further comprises one or more compounds selected from compounds represented by General Formulas (LC1)-2, (LC1)-3, (LC1)-4, (LC2)-4, (LC2)-5, (LC2)-6, (LC2)-7, (LC2)-8, (LC2)-9, and (LC2)-10

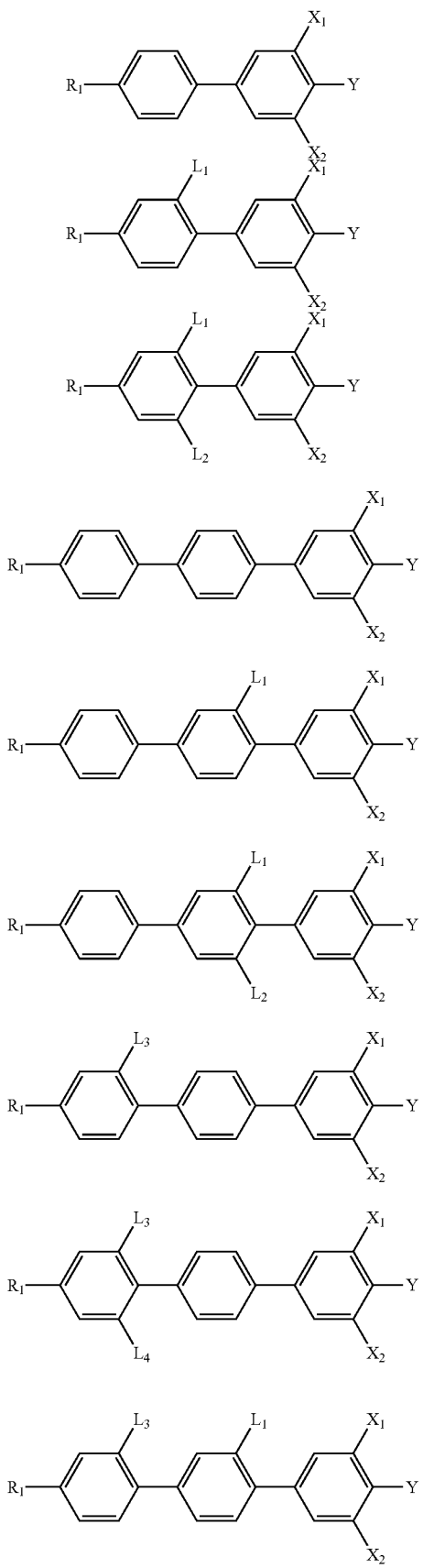

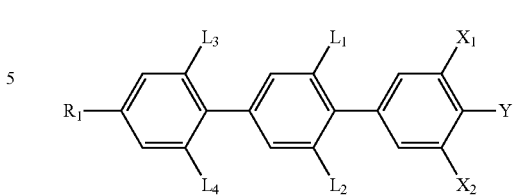

wherein $R_1$ represents an alkyl group having 1 to 15 carbon atoms; one or more $CH_2$ groups in the alkyl group may be substituted by —O—, —CH=CH—, —CO—, —OCO—, —COO—, —C≡C—, —$CF_2$O— or —O$CF_2$— such that O atoms are not directly adjacent to each other; one or more H atoms in the alkyl group may be optionally substituted by halogen; Y represents Cl, F, $CF_3$ or $OCF_3$; $X_1$, $X_2$, $L_1$, $L_2$, $L_3$ and $L_4$ each represent H, Cl, F, $CF_3$ or $OCF_3$.

22. The liquid crystal display device according to claim 1, wherein the liquid crystal composition further comprises one or more compounds selected from compounds represented by General Formulas (LC3)-3, (LC3)-22, (LC3)-23, (LC3)-24, and (LC3)-25

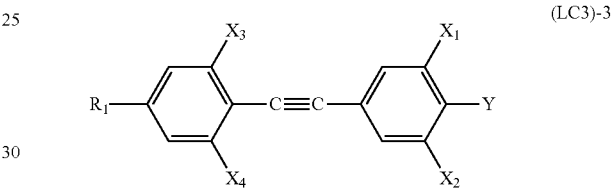

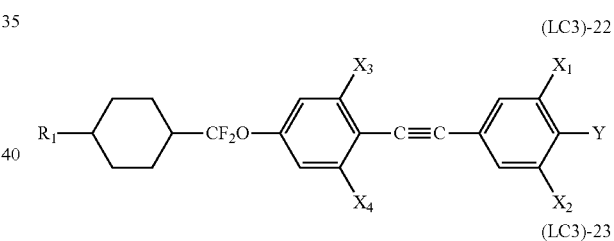

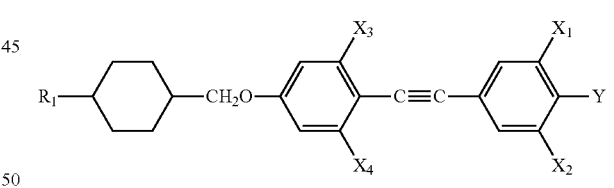

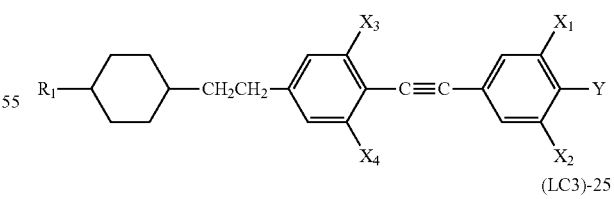

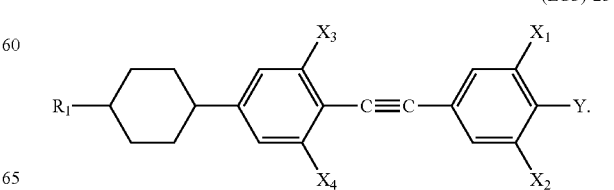

23. The liquid crystal display device according to claim 1, wherein the liquid crystal composition further comprises one or more compounds selected from compounds represented by General Formulas (LC6)-1, (LC6)-5, and (LC6)-14

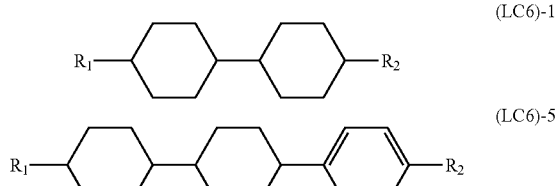

(LC6)-1

(LC6)-5

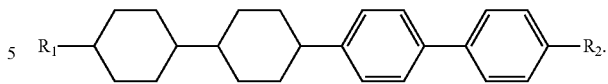

(LC6)-14

24. The liquid crystal display device according to claim 1, wherein the liquid crystal composition further comprises one or more compounds selected from compounds represented by General Formulas (LC6)-4, (LC6)-12, and (LC6)-15

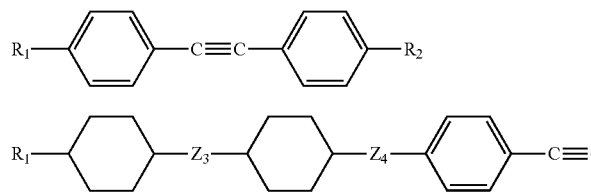

(LC6)-4

(LC6)-12

(LC6)-15

* * * * *